(12) United States Patent
Iwabuchi

(10) Patent No.: US 10,752,058 B2
(45) Date of Patent: Aug. 25, 2020

(54) TIRE

(71) Applicant: BRIDGESTONE CORPORATION, Chuo-ku, Tokyo (JP)

(72) Inventor: Sotaro Iwabuchi, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 243 days.

(21) Appl. No.: 15/573,490

(22) PCT Filed: May 13, 2016

(86) PCT No.: PCT/JP2016/064389
§ 371 (c)(1),
(2) Date: Nov. 13, 2017

(87) PCT Pub. No.: WO2016/182079
PCT Pub. Date: Nov. 17, 2016

(65) Prior Publication Data
US 2018/0126795 A1    May 10, 2018

(30) Foreign Application Priority Data

May 14, 2015  (JP) ................................. 2015-099525
May 14, 2015  (JP) ................................. 2015-099526
(Continued)

(51) Int. Cl.
*B60C 13/00*  (2006.01)
*B60C 13/02*  (2006.01)
*B60C 11/13*  (2006.01)

(52) U.S. Cl.
CPC ............ *B60C 13/001* (2013.01); *B60C 13/02* (2013.01); *B60C 2011/1361* (2013.01)

(58) Field of Classification Search
CPC ................................................... B60C 13/001
(Continued)

(56) References Cited

U.S. PATENT DOCUMENTS

2009/0218019 A1   9/2009  Paturle
2011/0139326 A1   6/2011  Nukushina
(Continued)

FOREIGN PATENT DOCUMENTS

CN        106061760 A    10/2016
EP        3115230 A1     1/2017
(Continued)

OTHER PUBLICATIONS

Machine Translation: FR-3009522-A1;Muhlhoff Olivier; (Year: 2019).*
(Continued)

*Primary Examiner* — Kendra Ly
(74) *Attorney, Agent, or Firm* — SOLARIS Intellectual Property Group, PLLC

(57) ABSTRACT

A tire including a decorative patterned portion that is formed on a tire surface, and that is configured including plural first projections extending in a first direction in plan view and arranged spaced apart from each other in a second direction orthogonal to the first direction, and plural second projections arranged between neighboring first projections and arranged spaced apart from each other in the first direction. In plan view, each of the second projections includes a bend portion and plural extension portions extending from the bend portion.

20 Claims, 15 Drawing Sheets

(30) Foreign Application Priority Data

| May 14, 2015 | (JP) | 2015-099527 |
|---|---|---|
| May 14, 2015 | (JP) | 2015-099528 |
| May 14, 2015 | (JP) | 2015-099531 |
| May 14, 2015 | (JP) | 2015-099537 |

(58) Field of Classification Search
USPC .................................................... D12/605
See application file for complete search history.

(56) References Cited

U.S. PATENT DOCUMENTS

| 2012/0227879 A1 | 9/2012 | Muhlhoff et al. |
| 2012/0273101 A1 | 11/2012 | Iwabuchi |
| 2014/0166177 A1 | 6/2014 | Muhlhoff et al. |
| 2014/0216622 A1 | 8/2014 | Muhlhoff et al. |
| 2015/0246587 A1 | 9/2015 | Muhlhoff et al. |
| 2015/0314652 A1 | 11/2015 | Iwabuchi |
| 2015/0314653 A1 | 11/2015 | Iwabuchi |
| 2015/0321523 A1 | 11/2015 | Takahashi |
| 2016/0137008 A1 | 5/2016 | Emorine et al. |
| 2016/0152095 A1 | 6/2016 | Berger et al. |
| 2016/0361955 A1 | 12/2016 | Iwabuchi |

FOREIGN PATENT DOCUMENTS

| FR | 3009522 A1 * | 2/2015 |
| JP | 2003246209 A * | 9/2003 |
| JP | 2009-512584 A | 3/2009 |
| JP | 2011-116306 A | 6/2011 |
| JP | 2011-121523 A | 6/2011 |
| JP | 2011-148338 A | 8/2011 |
| JP | 2013-505872 A | 2/2013 |
| JP | 2014-522341 A | 9/2014 |
| JP | 2015-168287 A | 9/2015 |
| JP | 2015-214186 A | 12/2015 |
| WO | 2011062241 A1 | 5/2011 |
| WO | 2014040967 A1 | 3/2014 |
| WO | 2014202729 A1 | 12/2014 |
| WO | 2014202731 A1 | 12/2014 |

OTHER PUBLICATIONS

Machine Translation: JP-2003246209-A; Iida, Hidekazu; (Year: 2019).*
Search Report of the Chinese office action dated Nov. 27, 2018, from the SIPO in a Chinese patent application corresponding to the instant patent application.
International Search Report issued in International Application No. PCT/JP2016/064389 dated Jul. 19, 2016.
Extended European Search Report dated May 4, 2018 issued in corresponding EP Patent Application No. 16792803.5.

* cited by examiner

TIRE

TECHNICAL FIELD

One aspect of the present invention relates to a tire formed with a decorative patterned portion configured by plural projections.

BACKGROUND ART

Japanese National-Phase Publication No. 2009-512584 describes technology to enhance the visibility of a patterned portion by forming the patterned portion configured by plural projections on a surface of a tire side-portion, and creating contrast between the patterned portion and an adjacent smooth portion.

SUMMARY OF INVENTION

Technical Problem

In cases in which a patterned portion is configured by staggered projections, such as in the technology described in Japanese National-Phase Publication No. 2009-512584, there is a tendency during molding for rubber to have difficulty flowing in between blades provided to the mold in order to form the projections, making molding characteristics of the projections difficult to secure.

On the other hand, in cases in which a patterned portion is configured by rib-shaped projections, reflection of light incident from a particular direction could become stronger, which can lead to a reduction in the contrast between the patterned portion and the smooth portion depending on the viewing angle.

In consideration of the above circumstances, an object of one aspect of the present invention is to provide a tire that suppresses reflection of light incident to the patterned portion from different directions, while securing molding characteristics of a patterned portion configured by plural projections.

Solution to Problem

A tire of a first aspect of the present invention includes a decorative patterned portion that is formed on a tire surface, and that is configured including plural first projections extending in a first direction in plan view and arranged spaced apart from each other in a second direction orthogonal to the first direction, and plural second projections arranged between neighboring first projections and arranged spaced apart from each other in the first direction. In plan view, each of the second projections includes a bend portion and plural extension portions extending from the bend portion.

Note that herein, a "direction intersecting the first direction in plan view" includes both directions that are inclined with respect to the first direction, and directions that are orthogonal to the first direction in plan view.

Advantageous Effects of Invention

One aspect of the present invention is capable of providing a tire that suppresses reflection of light incident to a patterned portion from different directions, while securing molding characteristics of the patterned portion configured by plural projections.

DESCRIPTION OF EMBODIMENTS

First Exemplary Embodiment

Figure 1:
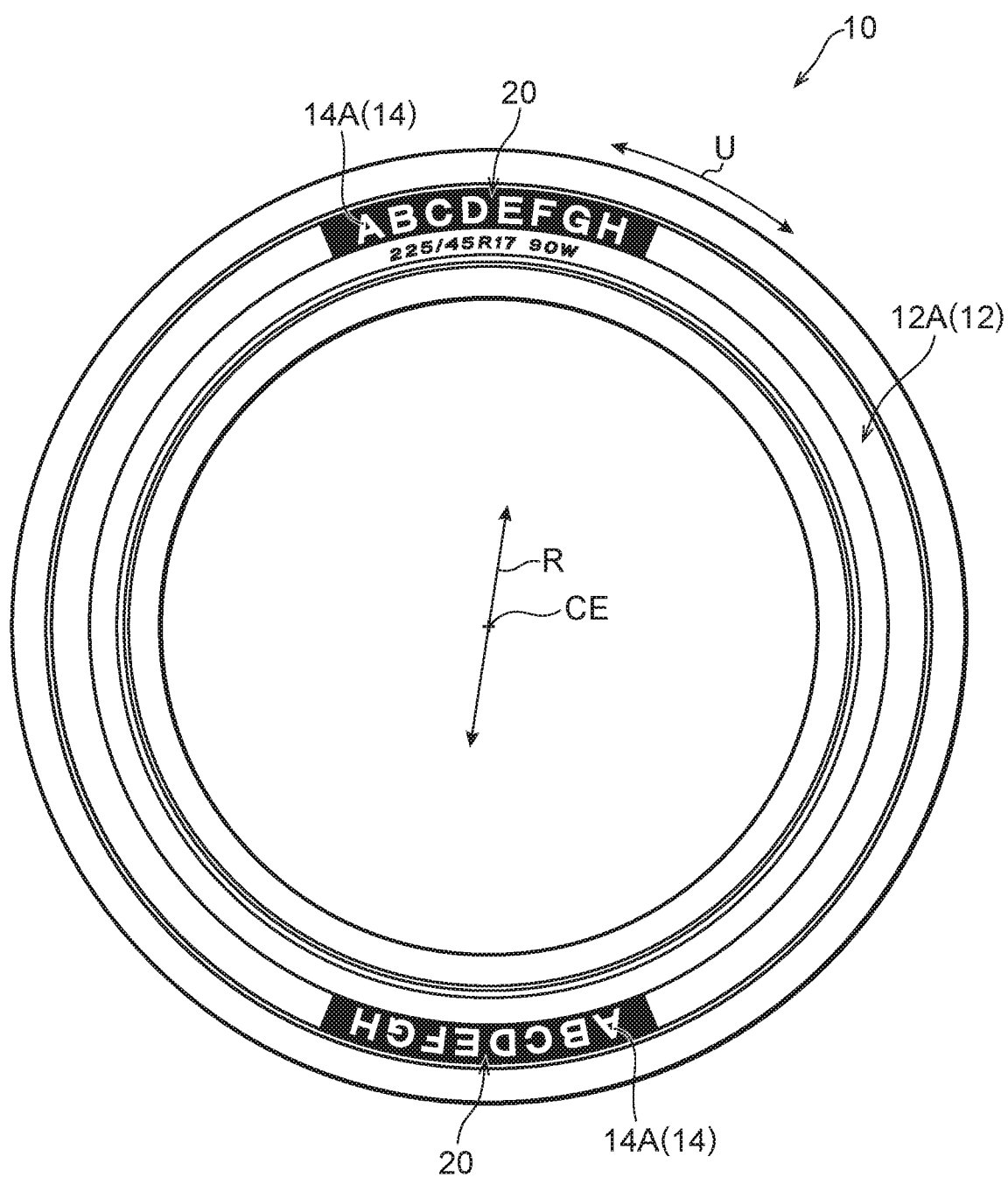
FIG. 1 is a side view of a tire of a first exemplary embodiment of the present invention.

Explanation follows regarding a tire according to a first exemplary embodiment of the present invention, with reference to the drawings. FIG. 1 is a side view of a pneumatic tire 10 (referred to below simply as the "tire 10") according to the present exemplary embodiment. In the present exemplary embodiment, the tire circumferential direction is indicated by U, and the tire radial direction is indicated by R.

As illustrated in FIG. 1, a surface 12A of a tire side portion 12 of the tire 10 is formed with designs 14, each formed on a smooth face, and with decorative patterned portions 20 surrounding respective configuration elements 14A configuring the designs 14. Note that the designs 14 and the patterned portions 20 are preferably disposed further to the tire radial direction outer side than the position of the tire maximum width of the tire 10.

The designs 14 are configured by text, such as "ABCDEFGH". Note that in the present exemplary embodiment, each of the letters configuring the designs 14 is one configuration element 14A. The configuration elements 14A are an example of a smooth portion of the present invention.

The patterned portions 20 are configured as low reflectivity portions that reflect less light than the surface 12A of the tire side portion 12, and less light than the designs 14 in particular. As illustrated in FIG. 1, as viewed from the side of the tire 10, the patterned portions 20 are configured by strips having circular arc shapes curving along the tire circumferential direction. Moreover, the patterned portions 20 are each configured including recesses 22, and projections 24 (see FIG. 3 and FIG. 4), projections 28 (see FIG. 3 and FIG. 5), and projections 32 (see FIG. 3 and FIG. 6) provided projecting from bottom faces 22A (see FIG. 4) of the recesses 22.

Note that the projections 24 of the present exemplary embodiment are an example of first projections of the present invention, and the projections 28 and the projections 32 of the present exemplary embodiment are each examples of second projections of the present invention.

In side view of the tire, the recesses 22 are configured by strips having circular arc shapes curving along the tire circumferential direction, similarly to the patterned portions 20.

Figure 2:
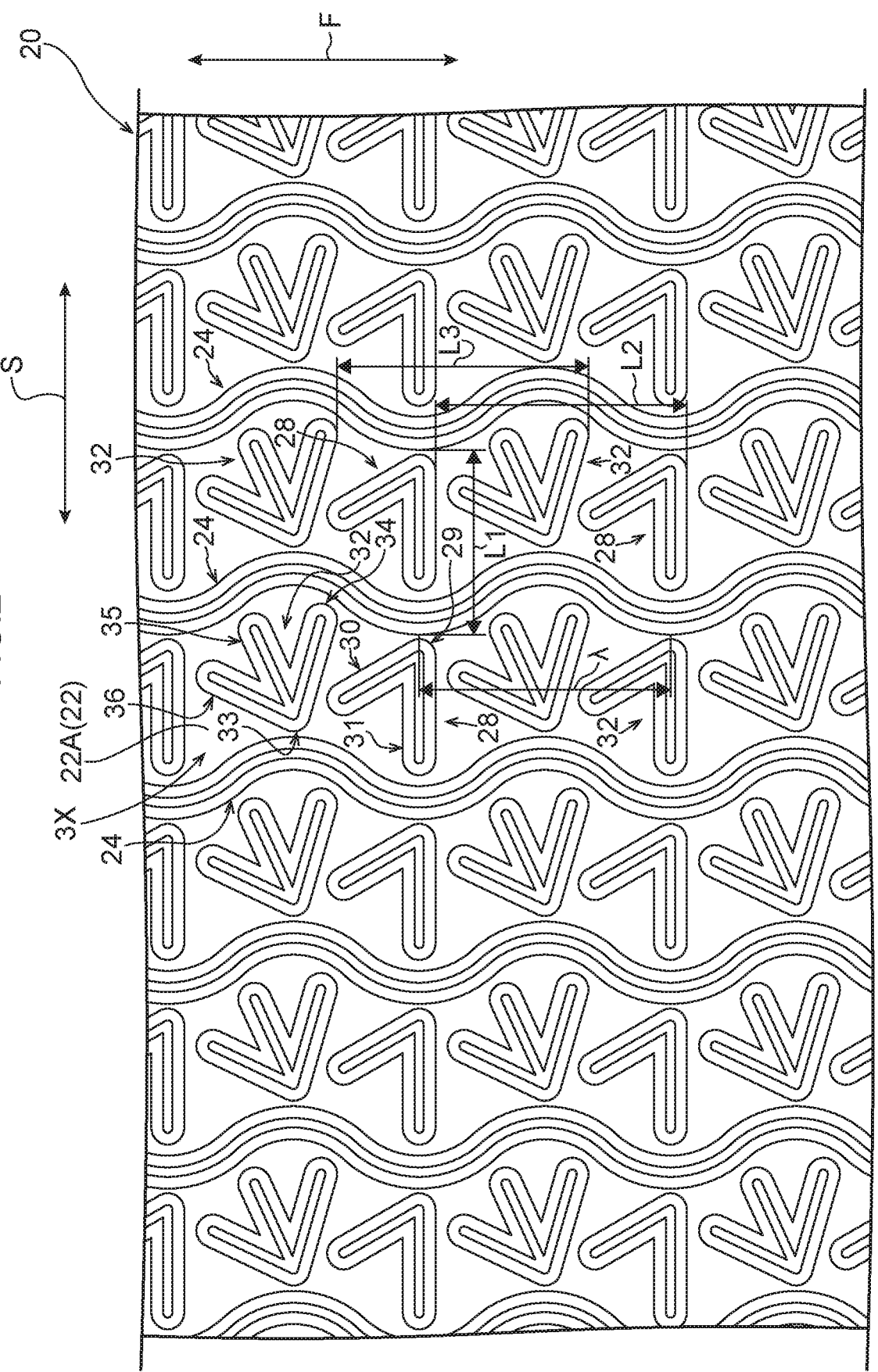
FIG. 2 is a plan view of a patterned portion of a tire of the first exemplary embodiment of the present invention.
Figure 3:
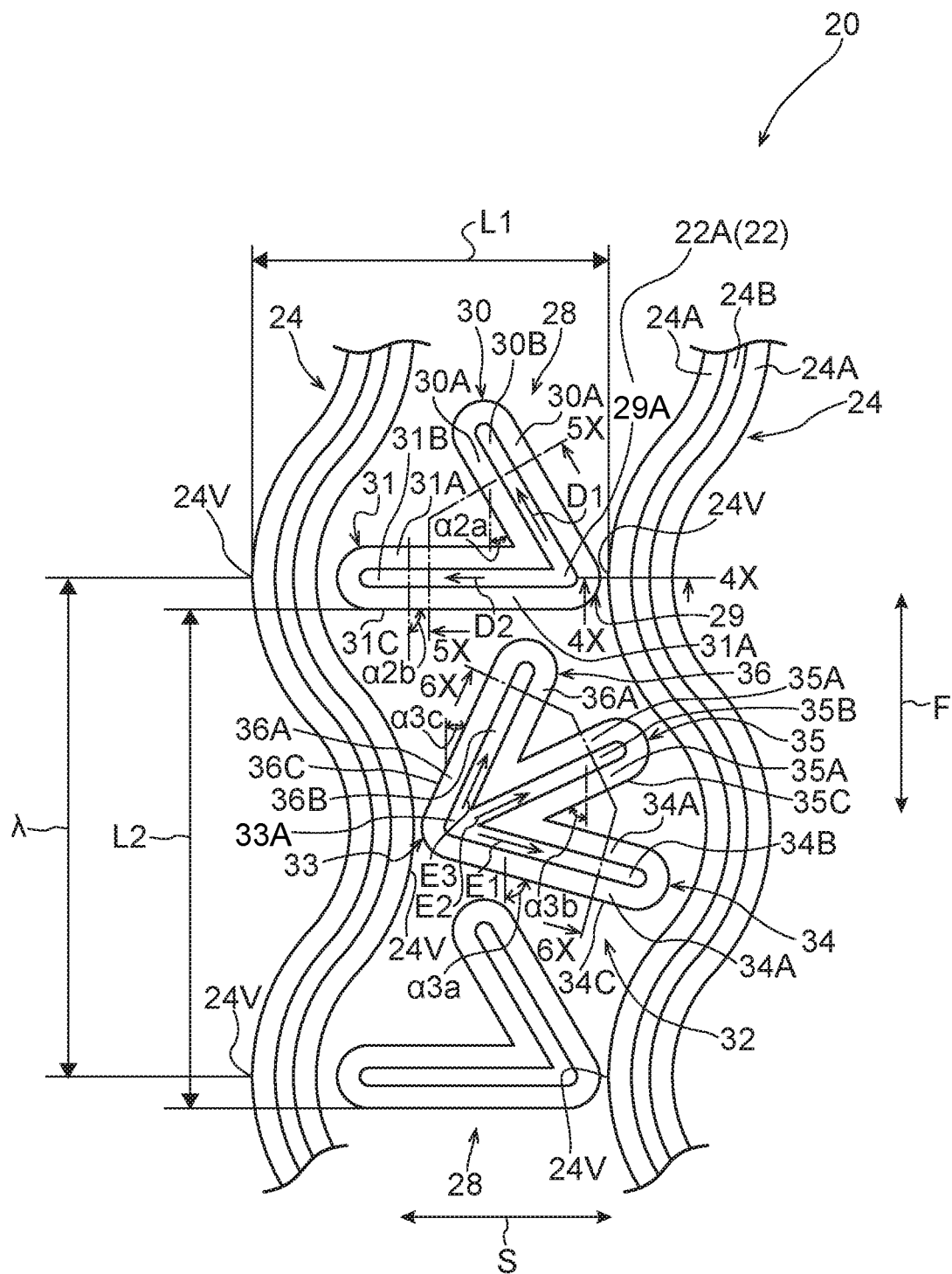
FIG. 3 is an enlarged plan view of the portion indicated by arrow 3X in FIG. 2.

As illustrated in FIG. 2 and FIG. 3, the projections 24 extend along a first direction (the direction indicated by arrow F in FIG. 2) in plan view of the patterned portions 20 (referred to hereafter simply as "in plan view"). Plural of the projections 24 are arranged spaced apart from each other in a second direction (the direction indicated by arrow S in FIG. 2) orthogonal to the first direction. Note that in the present exemplary embodiment, the spacings between neighboring projections 24 (spacings along the second direction) are constant.

In plan view, each projection 24 has a shape with an amplitude in the second direction. Note that in the present exemplary embodiment, in plan view, the projections 24 have a sine wave shape with a constant amplitude and a constant wavelength $\lambda$. However, the present invention is not limited to such a configuration. In FIG. 3, amplitude portions of the projections 24 are indicated by the reference numeral 24V.

Figure 4:
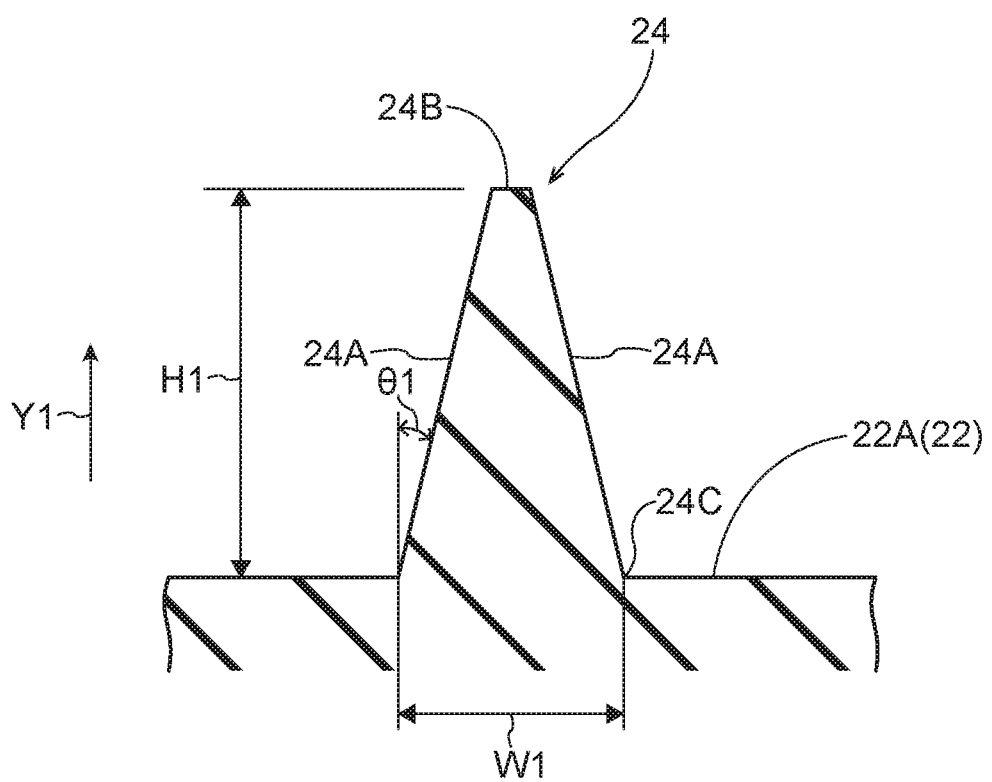
FIG. 4 is a cross-section taken along line 4X-4X in FIG. 3.

As illustrated in FIG. 4, when viewing the projection 24 in cross-section taken along a direction orthogonal to its extension direction, wall faces 24A of the projection 24 are inclined with respect to the projection direction (the direction indicated by Y1 in FIG. 4) such that a spacing W1 between the wall faces 24A on either side of projection 24 gradually increases on progression from an apex 24B toward a base 24C. Specifically, when viewing the projection 24 in cross-section taken along a direction orthogonal to its extension direction, the wall faces 24A on either side each jut out further in directions orthogonal to the projection direction Y1 at the base 24C than at the apex 24B. Moreover, in the present exemplary embodiment, the wall faces 24A of the projection 24 extend in continuous straight line shapes from the apex 24B to the base 24C. Note that the "base 24C" referred to here indicates a portion at a boundary between the projection 24 and the bottom face 22A.

Moreover, in the present exemplary embodiment, the apexes 24B of the projections 24 have flattened profiles. Accordingly, in the projections 24, rigidity of the apexes 24B of the projections 24 can be secured in comparison to configurations in which, for example, the apex 24B of the projection 24 has a pointed profile, thereby enhancing durability.

When viewing the projections 24 in cross-section taken along the direction orthogonal to the extension direction, a length along the projection direction (projection direction height (referred to hereafter as the "projection height" as appropriate)) H1 is set in a range of from 0.8 to 6 times the spacing W1 between the wall faces 24A on either side at the base 24C.

Moreover, when viewing the projections 24 in cross-section taken along the direction orthogonal to the extension direction, an angle $\theta 1$ on an acute angle side of each wall face 24A with respect to the projection direction is set in a range of from 5° to 30°. Note that the angle $\theta 1$ is more preferably set in a range of from 15° to 25°. Moreover, in the present exemplary embodiment, the angles $\theta 1$ of the wall faces 24A on either side are set to the same value as each other. However, the present invention is not limited to such a configuration, and the angles $\theta 1$ of the wall faces 24A on either side may be set to different values from each other.

As illustrated in FIG. 3, a placement pitch L1 of the projections 24 is set within a range of from 0.5 mm to 1 mm. Moreover, the placement pitch L1 is more preferably set within a range of 0.6 mm to 0.8 mm.

As illustrated in FIG. 2 and FIG. 3, plural of the projections 28 are arranged between neighboring of the projections 24. The projections 28 are spaced apart from each other in the first direction F. A placement pitch L2 of the projections 28 is set to the same length as the wavelength $\lambda$ of the sine wave shape of the projections 24.

Moreover, the projections 28 are arranged discretely to the projections 24 on either side thereof.

As illustrated in FIG. 3, each of the projections 28 includes a bend portion 29 that bends between directions intersecting the first direction in plan view, and extension portions 30, 31 that extend from the bend portion 29 in separate directions from each other, these being directions intersecting the first direction. Specifically, in plan view, each projection 28 has a shape (a substantially bifurcated shape) in which the extension portion 30 extends from one end of the bend portion 29 in the direction indicated by arrow D1, and the extension portion 31 extends from the other end of the bend portion 29 in the direction indicated by arrow D2. Note that the arrow D1 indicates the extension direction of the extension portions 30, and the arrow D2 indicates the extension direction of the extension portions 31.

Moreover, in the present exemplary embodiment, the extension portions 30, 31 are each configured extending in straight line shapes along their respective extension directions in plan view. However, the present invention is not limited to such a configuration. For example, the extension portions 30, 31 may be configured so as to extend curving (in curved line shapes) along their respective extension directions in plan view.

Figure 5:
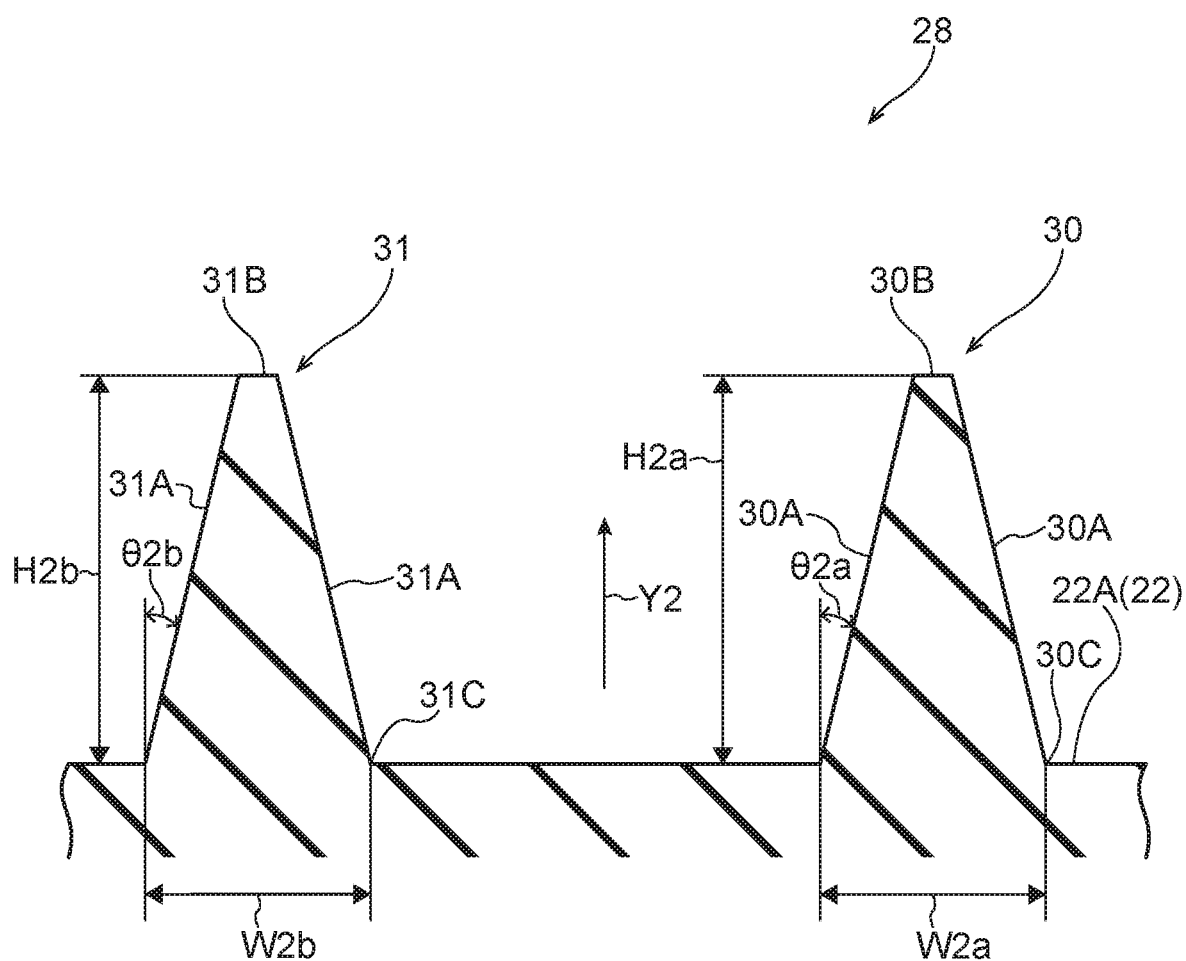
FIG. 5 is a cross-section taken along line 5X-5X in FIG. 3.

As illustrated in FIG. 5, as viewed in cross-section taken along a direction orthogonal to its extension direction, wall faces 30A of the extension portion 30 are inclined with respect to the projection direction (the direction indicated by Y2 in FIG. 5) such that a spacing W2$a$ between wall faces 30A on either side of each extension portion 30 gradually increases on progression from an apex 30B toward a base 30C. Moreover, the wall faces 30A on either side respectively jut out further in directions orthogonal to the projection direction Y2 at the base 30C than at the apex 30B. Moreover, in the present exemplary embodiment, the wall faces 30A of the extension portion 30 extend in continuous straight line shapes from the apex 30B to the base 30C. Note that the "base 30C" referred to here indicates a portion at a boundary between the extension portion 30 and the bottom face 22A.

Moreover, in the present exemplary embodiment, each apex 30B has a flattened profile when viewing the extension portion 30 in cross-section taken along a direction orthogonal to its extension direction.

When viewing the extension portion 30 in cross-section taken along a direction orthogonal to its extension direction, the length along the projection direction (the projection direction height (referred to hereafter as the "projection height" as appropriate)) H2a is set within a range of from 0.8 to 6 times the spacing W2a between the wall faces 30A on either side at the base 30C.

Moreover, when viewing the extension portion 30 in cross-section taken along a direction orthogonal to its extension direction, an angle θ2a on the acute angle side of each wall face 30A with respect to the projection direction is set within a range of from 5° to 30°. Note that the angle θ2a is more preferably set within a range of from 15° to 25°. Moreover, in the present exemplary embodiment, the angles θ2a are set to the same value for the wall faces 30A on either side of the extension portion 30. However, the present invention is not limited to such a configuration, and the angles θ2a may be set to different values from each other for the wall faces 30A on either side of the extension portion 30.

As illustrated in FIG. 5, as sectioned in a direction orthogonal to its extension direction, the extension portion 31 has the same cross-section profile as the cross-section profile of the extension portion 30 as sectioned in a direction orthogonal to its extension direction. The extension portion 31 therefore projects in the same direction as the extension portion 30. Moreover, in the present exemplary embodiment, the apexes 30B, 31B of the respective extension portions 30, 31 are each contiguous with the apex 29A of the bend portion 29.

Moreover, when viewing the extension portion 31 in cross-section taken along a direction orthogonal to its extension direction, the length along the projection direction (the projection direction height (referred to hereafter as the "projection height" as appropriate)) H2b is set within a range of from 0.8 to 6 times the spacing W2b between wall faces 31A on either side of the extension portion 31 at a base 31C. Note that the "base 31C" referred to here indicates a portion at a boundary between the extension portion 31 and the bottom face 22A.

Moreover, when viewing the extension portion 31 in cross-section taken along a direction orthogonal to its extension direction, an angle θ2b on the acute angle side of each wall face 31A with respect to the projection direction is set within a range of from 5° to 30°. Note that the angle θ2b is more preferably set within a range of from 15° to 25°. Moreover, in the present exemplary embodiment, the angles θ2b are set to the same value for the wall faces 31A on either side. However, the present invention is not limited to such a configuration, and the angles θ2b may be set to different values from each other for the wall faces 31A on either side.

In the present exemplary embodiment, the size of the cross-section of the extension portion 31 as taken along a direction orthogonal to its extension direction is the same size as the size of the cross-section of the extension portion 30 as taken along a direction orthogonal to its extension direction. Namely, for the extension portion 31, the spacing W2b, the projection height H2b, and the angle θ2b are respectively set to the same values as the spacing W2a, the projection height H2a, and the angle θ2a of the extension portion 30.

As illustrated in FIG. 2 and FIG. 3, plural of the projections 32 are arranged between the neighboring projections 24. The projections 32 are spaced apart from each other in the first direction F. Specifically, the projections 32 are arranged between neighboring of the projections 28 in the first direction. In other words, the projections 28 and the projections 32 are arranged alternately in the first direction between the neighboring projections 24. A placement pitch L3 of the projections 32 is set to the same length as the wavelength λ of the sine wave shape of the projection 24.

Moreover, the projections 32 are arranged discretely to the projections 24 on either side.

As illustrated in FIG. 3, each of the projections 32 includes a bend portion 33 that bends between directions intersecting the first direction in plan view, and extension portions 34, 35, 36 that extend from the bend portion 33 in separate directions from each other, these being directions intersecting the first direction. Specifically, in plan view, each of the projections 32 has a shape (substantially trifurcated shape) in which the extension portion 34 extends from one end of the bend portion 33 in the direction indicated by arrow E1, the extension portion 35 extends from inside the bend of the bend portion 33 in the direction indicated by arrow E2, and the extension portion 36 extends from the other end of the bend portion 33 in the direction indicated by arrow E3. Note that arrow E1 indicates the extension direction of the extension portion 34, arrow E2 indicates the extension direction of the extension portion 35, and the arrow E3 indicates the extension direction of the extension portion 36.

Moreover, in the present exemplary embodiment, in plan view, the extension portions 34, 35, 36 are each configured extending in straight line shapes along their respective extension directions. However, the present invention is not limited to such a configuration. For example, the extension portions 34, 35, 36 may be configured so as to extend curving along their respective extension directions (in curved line shapes) in plan view.

Figure 6:
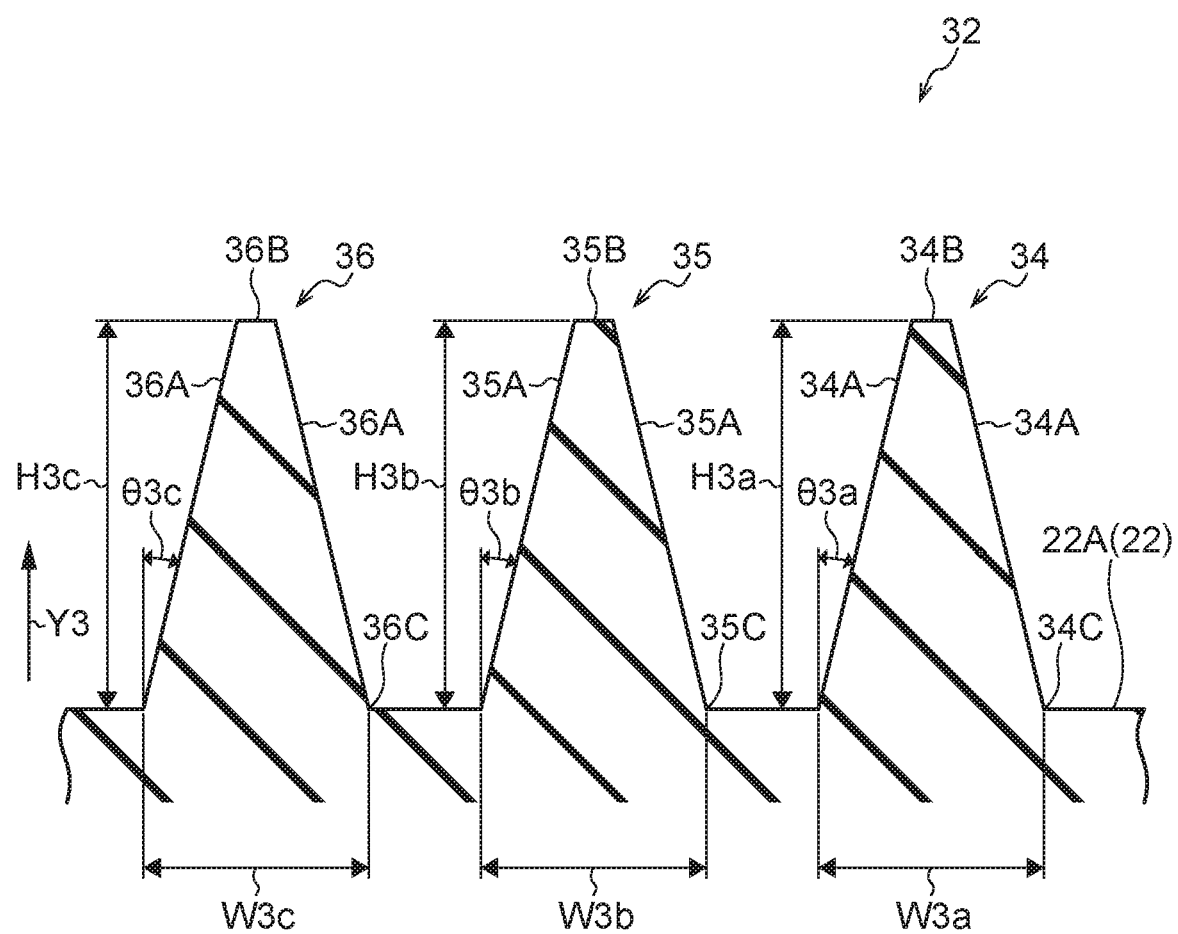
FIG. 6 is a cross-section taken along line 6X-6X in FIG. 3.

As illustrated in FIG. 6, as viewed in cross-section taken along a direction orthogonal to its extension direction, wall faces 34A of the extension portion 34 are inclined with respect to the projection direction (the direction indicated by Y3 in FIG. 6) such that a spacing W3a between wall faces 34A on either side of extension portion 34 gradually increases on progression from an apex 34B toward a base 34C. Moreover, the wall faces 34A on either side of the extension portion 34 respectively jut out further in directions orthogonal to the projection direction Y3 at the base 34C than at the apex 34B. Moreover, in the present exemplary embodiment, the wall faces 34A of the extension portion 34 extend in continuous straight line shapes from the apex 34B to the base 34C. Note that the "base 34C" referred to here indicates a portion at a boundary between the extension portion 34 and the bottom face 22A.

Moreover, in the present exemplary embodiment, each apex 34B has a flattened profile when viewing the extension portion 34 in cross-section taken along a direction orthogonal to its extension direction.

When viewing the extension portion 34 in cross-section taken along a direction orthogonal to its extension direction, the length along the projection direction (the projection direction height (referred to hereafter as the "projection height" as appropriate)) H3a is set within a range of from 0.8 to 6 times the spacing W3a between the wall faces 34A on either side at the base 34C.

Moreover, when viewing the extension portion 34 in cross-section taken along a direction orthogonal to its extension direction, an angle θ3a on the acute angle side of each wall face 34A with respect to the projection direction is set within a range of from 5° to 30°. Note that the angle θ3a is more preferably set within a range of from 15° to 25°. Moreover, in the present exemplary embodiment, the angles θ3a are set to the same value for the wall faces 34A on either side. However, the present invention is not limited to such a configuration, and the angles θ3a may be set to different values from each other for the wall faces 34A on either side.

As illustrated in FIG. 6, as sectioned in a direction orthogonal to its extension direction, the extension portion 35 has the same cross-section profile as the cross-section profile of the extension portion 34 as sectioned in a direction orthogonal to its extension direction. The extension portion 35 therefore projects in the same direction as the extension portion 34.

Moreover, when viewing the extension portion 35 in cross-section taken along a direction orthogonal to its extension direction, the length along the projection direction (the projection direction height (referred to hereafter as the "projection height" as appropriate)) H3b is set within a range of from 0.8 to 6 times the spacing W3b between wall faces 35A on either side at a base 35C. Note that the "base 35C" referred to here indicates a portion at a boundary between the extension portion 35 and the bottom face 22A.

Moreover, when viewing the extension portion 35 in cross-section taken along a direction orthogonal to its extension direction, an angle θ3b on the acute angle side of each wall face 35A with respect to the projection direction is set within a range of from 5° to 30°. Note that the angle θ3b is more preferably set within a range of from 15° to 25°. Moreover, in the present exemplary embodiment, the angles θ3b are set to the same value for the wall faces 35A on either side. However, the present invention is not limited to such a configuration, and the angles θ3b may be set to different values from each other for the wall faces 35A on either side.

In the present exemplary embodiment, the size of the cross-section of the extension portion 35 as taken along a direction orthogonal to its extension direction is the same size as the size of the cross-section of the extension portion 34 as taken along a direction orthogonal to its extension direction. Namely, for the extension portion 35, the spacing W3b, the projection height H3b, and the angle θ3b are respectively set to the same values as the spacing W3a, the projection height H3a, and the angle θ3a of the extension portion 34.

As illustrated in FIG. 6, as sectioned in a direction orthogonal to its extension direction, the extension portion 36 has the same cross-section profile as the cross-section profile of the extension portion 34 as sectioned in a direction orthogonal to its extension direction. In the present exemplary embodiment, the extension portion 36 therefore projects in the same direction as the extension portions 34, 35. Moreover, in the present exemplary embodiment, the apexes 34B, 35B, 36B of the respective extension portions 34, 35, 36 are each contiguous with the apex 33A of the bend portion 33.

Moreover, when viewing the extension portion 36 in cross-section taken along a direction orthogonal to its extension direction, the length along the projection direction (the projection direction height (referred to hereafter as the "projection height" as appropriate)) H3c is set within a range of from 0.8 to 6 times the spacing W3c between wall faces 36A on either side at a base 36C. Note that the "base 36C" referred to here indicates a portion at a boundary between the extension portion 36 and the bottom face 22A.

Moreover, when viewing the extension portion 36 in cross-section taken along a direction orthogonal to its extension direction, an angle θ3c on the acute angle side of each wall face 36A with respect to the projection direction is set within a range of from 5° to 30°. Note that the angle θ3c is more preferably set within a range of from 15° to 25°. Moreover, in the present exemplary embodiment, the angles θ3c are set to the same value for the wall faces 36A on either side. However, the present invention is not limited to such a configuration, and the angles θ3c may be set to different values from each other for the wall faces 36A on either side.

In the present exemplary embodiment, the size of the cross-section of the extension portion 36 as taken along a direction orthogonal to its extension direction is the same size as the size of the cross-section of the extension portion 34 as taken along a direction orthogonal to its extension direction. Namely, for the extension portion 36, the spacing W3c, the projection height H3c, and the angle θ3c are respectively set to the same values as the spacing W3a, the projection height H3a, and the angle θ3a of the extension portion 34. Accordingly, in the present exemplary embodiment, the spacings W3a, W3b, W3c are all set to the same value, the projection heights H3a, H3b, H3c are all set to the same value, and the angle θ3a, θ3b, θ3c are all set to the same value. Note that the present invention is not limited to such a configuration, and at least one out of the spacings W3a, W3b, W3c may be set to a different value, at least one out of the projection heights H3a, H3b, H3c may be set to a different value, and at least one out of the angles θ3a, θ3b, θ3c may be set to a different value. Alternatively, all of these may be set to different values from each other.

In the present exemplary embodiment, the projection direction of the projection 24 (the arrow Y1 direction in FIG. 4), the projection directions of the extension portions 30, 31 (the arrow Y2 direction in FIG. 5), and the projection directions of the extension portions 34, 35, 36 (the arrow Y3 direction in FIG. 6) are all the same direction as each other. Note that the present invention is not limited to such a configuration.

As illustrated in FIG. 3, in plan view, the extension portions 30, 31 of the projections 28 and the extension portions 34, 35, 36 of the projections 32 are all at different angles with respect to the first direction. Specifically, angles α2a, α2b, α3a, α3b, α3c of the respective extension portions 30, 31, 34, 35, 36 with respect to the first direction are all set to different values from each other. In other words, in plan view, the respective extension portions of the projections 28 and the projections 32 neighboring each other in the first direction each form different angles from each other with respect to the first direction.

The projection heights H1, H2a, H2b, H3a, H3b, H3c are each set within a range of from 0.1 mm to 1 mm. Note that the projection heights H1, H2a, H2b, H3a, H3b, H3c are each more preferably set within a range of from 0.2 mm to 0.8 mm.

Moreover, in the present exemplary embodiment, the projection heights H1, H2a, H2b, H3a, H3b, H3c are all set to the same value as each other. However, the present invention is not limited to such a configuration, and at least one out of the projection heights H1, H2a, H2b, H3a, H3b, H3c may be set to a different value.

In the present exemplary embodiment, the projection direction positions of the apexes 24B, 30B, 31B, 34B, 35B, 36B are lower than the surface 12A of the tire side portion 12. However, the present invention is not limited to such a configuration. For example, the surface 12A and the apexes 24B, 30B, 31B, 34B, 35B, 36B may be at the same position in the projection direction, or the projection direction positions of the apexes 24B, 30B, 31B, 34B, 35B, 36B may be higher than the surface 12A.

Moreover, in the present exemplary embodiment, the angles θ1, θ2a, θ2b, θ3a, θ3b, θ3c are all set to the same value as each other. However, the present invention is not limited to such a configuration, and at least one out of the angles θ1, θ2a, θ2b, θ3a, θ3b, θ3c may be set to a different value.

Moreover, in the present exemplary embodiment, the spacings W1, W2a, W2b, W3a, W3b, W3c are all set to the same value as each other. However, the present invention is not limited to such a configuration, and at least one out of the spacings W1, W2a, W2b, W3a, W3b, W3c may be set to a different value.

Next, explanation follows regarding operation and advantageous effects of the tire 10 of the present exemplary embodiment.

In the tire 10, the decorative patterned portions 20 configured including the projections 24, the projections 28, and the projections 32 are formed on the surface 12A of the tire side portion 12. In the patterned portions 20, incident light is attenuated while being reflected back and forth between the respective projections, thereby suppressing light reflection. Namely, the patterned portions 20 reflect less light than the surface 12A or the designs 14, and therefore appear black. This increases the contrast between the patterned portions 20 and the designs 14 adjacent to the patterned portions 20, thus enhancing the visibility of the patterned portions 20.

Note that in the tire 10, since the projections 24 extend along the first direction in plan view, the flow of rubber in between molding blades of a mold (not illustrated in the drawings) used to mold the projections 24 when molding the tire in the mold is facilitated (in other words, it is easier for air to escape from between the molding blades) than, for example, in a configuration in which the projections 24 are staggered and do not extend in a single direction. This thereby secures molding characteristics of the projections 24 (the patterned portions 20).

Moreover, in the tire 10, in plan view, plural of the projections 28 and the projections 32 are arranged between neighboring of the projections 24, such that the projections 28 and the projections 32 are arranged alternately, and are spaced apart from each other, in the first direction. Accordingly, even when light is incident to the patterned portion 20 from a specific direction (for example, a direction orthogonal to the second direction), the incident light is attenuated while being reflected back and forth between the projections 28 and the projections 32, thereby suppressing light reflection in comparison to a configuration in which, for example, the projections 28 and the projections 32 are not arranged between the neighboring projections 24. Namely, light reflection can be suppressed (uniformly suppressed) even when light is incident to the patterned portion 20 from different directions. A reduction in the contrast between the patterned portion 20 and the design 14 depending on the angle from which the patterned portion 20 is viewed is thus suppressed. As a result, the visibility of the patterned portion 20 is enhanced, and the visibility of the design 14 including the configuration elements 14A surrounded by the patterned portion 20 is also enhanced.

Moreover, in the tire 10, since the projections 28 and the projections 32 are respectively configured discretely to the projections 24, when molding the tire in the mold, rubber flows in between molding blades used to mold the projections 24, between molding blades used to mold the projections 28, and between molding blades used to mold the projections 32 separately, thus increasing the rubber filling speed and enabling a reduction in molding time in comparison to configurations in which, for example, portions of the projections 28 and portions of the projections 32 are connected to the projection 24. Moreover, since both the projections 28 and the projections 32 are configured discretely to the projections 24, light incident to the patterned portions 20 is reflected back and forth between the projection 24 and the projections 28 as well as in deeper portions (base side (bottom side)) between the projections 24 and the projections 32, thereby effectively suppressing reflection of light.

In the tire 10, in plan view, the projections 24 have a shape with an amplitude in the second direction. Accordingly, light incident to the patterned portions 20 more readily undergoes scattering reflection between the respective projections 24, 28, 32 than in cases in which, for example, the projections 24 extend in straight line shapes along the first direction in plan view. Light reflection is thereby further suppressed.

Moreover, in the tire 10, in plan view each of the projections 24 has a sine wave shape. Accordingly, since the wall faces 24A of the projections 24 have curved faces, light incident to patterned portions 20 even more readily undergoes scattering reflection between the respective projections 24, 28, 32 than in configurations in which, for example, the projections 24 are configured by rectangular wave shapes in plan view. The light is thus more effectively attenuated, further suppressing light reflection.

Moreover, in the tire 10, since the spacing between neighboring projections 24 is constant, reflection of light incident to the patterned portion 20 from different directions can be further suppressed in comparison to cases in which, for example, the spacing between the neighboring projections 24 is not constant. Moreover, since the spacing between neighboring projections 24 is constant, the projections 28 and the projections 32 can be easily arranged between the neighboring projections 24. In other words, molding characteristics for the projections 28 and the projections 32 can be easily secured.

Moreover, in the tire 10, since in plan view the extension portions 30, 31 of the projections 28 each extend in a direction intersecting the first direction, projection components having different directions are increased by the projections 28 in comparison to cases in which, for example, the extension portions 30 or the extension portions 31 of the projections 28 extend along the first direction in plan view.

Moreover, since in plan view the extension portions 34, 35, 36 of the projections 32 each extend in a direction intersecting the first direction, projection components having different directions are increased by the projections 32 in comparison to cases in which, for example, the extension portions 34, the extension portions 35, or the extension portions 36 of the projections 32 extend along the first direction in plan view.

Light incident to the patterned portions 20 is thus more effectively attenuated, further suppressing light reflection.

In the tire 10, since in plan view the projections 28 each include the plural extension portions 30, 31 extending from the bend portion 29, the projection components extending in different directions are increased. Light incident to the patterned portions 20 is thus more effectively attenuated, and light reflection is thereby further suppressed. Moreover, since in plan view the projections 32 each include the plural extension portions 34, 35, 36 extending from the bend portion 33, the projection components extending in different directions are increased still further, light incident to the patterned portions 20 is more effectively attenuated, and light reflection is thereby further suppressed.

In the tire 10, since in plan view the angles with respect to the first direction α2a, α2b, α3a, α3b, α3c of the extension portions 30, 31, 34, 35, 36 of the respective projections 28 and projections 32 that are neighboring each other in the first direction are all different from each other, projection components in different directions are increased by the projections 28 and projections 32 neighboring in the first direction in comparison to cases in which, for example, the angles with respect to the first direction α2a, α2b, α3a, α3b, α3c of the extension portions 30, 31, 34, 35, 36 of the respective projections 28 and projections 32 that are neighboring each other in the first direction are not different from each other (some are the same as each other). Light incident to the patterned portions 20 is thus more effectively attenuated, further suppressing light reflection.

Moreover, in the tire 10, the projections 28, each including the two extension portions 30, 31, and the projections 32, each including the three extension portions 34, 35, 36, are arranged alternately along the first direction between neighboring of the projections 24. In other words, the projections 28 and the projections 32 neighboring each other along the first direction have different numbers of extension portions from each other. Accordingly, in the tire 10, light incident to the patterned portions 20 becomes even more likely to undergo scattering reflection between the respective projections 24, 28, 32 than in cases in which, for example, the projections 28 and the projections 32 neighboring in the first direction have the same number of extension portions as each other. The light is thus more effectively attenuated, further suppressing light reflection.

Moreover, in the tire 10, the placement pitch L1 is set within a range of from 0.5 mm to 1 mm, and the projection heights H1, H2a, H2b, H3a, H3b, H3c are set within a range of 0.1 mm to 1 mm. Accordingly, light incident to the patterned portions 20 is attenuated while being reflected back and forth between the respective projections 24, 28, 32, such that light reflection is more thoroughly suppressed than in cases in which, for example, the placement pitch L1 is not set within a range of from 0.5 and to 1 mm, and the projection heights H1, H2a, H2b, H3a, H3b, H3c are not set within a range of 0.1 mm to 1 mm.

Note that if the placement pitch L1 is less than 0.5 mm, the projections 28 and the projections 32 become too small, and it might not be possible to secure molding characteristics. On the other hand, if the placement pitch L1 is greater than 1 mm, light reflection by the bottom face 22A might become strong.

Moreover, if the projection heights H1, H2a, H2b, H3a, H3b, H3c are below 0.1 mm, it becomes difficult to secure molding characteristics of the projections 24, the projections 28, and the projections 32, and it might not be possible to sufficiently attenuate incident light. On the other hand, if the projection heights H1, H2a, H2b, H3a, H3b, H3c are greater than 1 mm, the projections 24, the projections 28, and the projections 32 might become liable to tilt over.

In the tire 10, when viewing the projection 24 in cross-section taken along a direction orthogonal to its extension direction, the wall faces 24A of the projection 24 are inclined in straight line shapes such that the spacing W1 between the wall faces 24A on either side of the projection 24 gradually increases on progression from the apex 24B toward the base 24C. Accordingly, the projections 24 are less liable to tilt over than in cases in which, for example, the spacing W1 between the wall faces 24A on either side is constant from the apex 24B to the base 24C.

Moreover, when viewing the projection 24 in cross-section taken along a direction orthogonal to its extension direction, the wall faces 24A on either side each jut out further in directions orthogonal to the projection direction at the base 24C than at the apex 24B. Accordingly, the projections 24 are less liable to tilt over than in cases in which, for example, only the wall face 24A on one side juts out further in a direction orthogonal to its projection direction at the base 24C than at the apex 24B. This thereby enables the advantageous effect of suppressing reflection of light incident to the patterned portion 20 to be maintained for a long time. Moreover, during demolding, the projections 24 are easy to remove from between molding blades used to mold the projections 24 in the mold.

Moreover, when viewing the extension portion 30 of the projection 28 in cross-section taken along a direction orthogonal to its extension direction, the wall faces 30A are inclined such that the spacing W2a between the wall faces 30A on either side gradually increases on progression from the apex 30B toward the base 30C. Accordingly, the extension portions 30 are less liable to tilt over than in cases in which, for example, the spacing W2a between the wall faces 30A on either side is constant from the apex 30B to the base 30C.

Moreover, when viewing the extension portion 30 in cross-section taken along a direction orthogonal to its extension direction, the wall faces 30A on either side jut out further in directions orthogonal to the projection direction at the base 30C than at the apex 30B. Accordingly, the extension portions 30 are less liable to tilt over than in cases in which, for example, only the wall face 30A on one side juts out further in a direction orthogonal to the projection direction at the base 30C than at the apex 30B.

The extension portions 31 of the projections 28 have the same configuration as the extension portions 30, and are thus not liable to tilt over.

Accordingly, the projections 28 as a whole are not liable to tilt over, enabling the advantageous effect of suppressing reflection of light incident to the patterned portion 20 to be maintained for a long time.

Moreover, during demolding, the extension portions 30, 31 are easy to remove from between molding blades used to mold the projections 28 in the mold. Namely, the projections 32 can be demolded easily.

Moreover, when viewing the extension portion 34 of the projection 32 in cross-section taken along a direction orthogonal to its extension direction, the wall faces 34A are inclined such that the spacing W3a between the wall faces 34A on either side gradually increases on progression from the apex 34B toward the base 34C. Accordingly, the extension portions 34 are less liable to tilt over than in cases in which, for example, the spacing W3a between the wall faces 34A on either side is constant from the apex 34B to the base 34C.

Moreover, when viewing the extension portion 34 in cross-section taken along a direction orthogonal to its extension direction, the wall faces 34A on either side jut out further in directions orthogonal to the projection direction at the base 34C than at the apex 34B. Accordingly, the extension portions 34 are less liable to tilt over than in cases in which, for example, only the wall face 34A on one side juts out further in a direction orthogonal to the projection direction at the base 34C than at the apex 34B.

The extension portions 35, 36 of the projections 32 also have the same configuration as the extension portion 34, and are thus not liable to tilt over.

Accordingly, the projections 32 as a whole are not liable to tilt over, enabling the advantageous effect of suppressing reflection of light incident to the patterned portion 20 to be maintained for a long time.

Moreover, during demolding, the extension portions 34, 35, 36 are easy to remove from between molding blades used to mold the projections 32 in the mold. Namely, the projections 32 can be demolded easily.

Moreover, in the tire 10, the projection height H1 of the projection 24 is set within a range of from 0.8 to 6 times the spacing W1 at the base 24C. This thereby enables tilting of the projection 24, as well as reflection of light incident to the patterned portion 20, to be suppressed more effectively than in cases in which, for example, the projection height H1 is not within a range of from 0.8 to 6 times the spacing W1.

Note that if the projection height H1 is less than 0.8 times the spacing W1 at the base 24C, light might be reflected strongly by the wall faces 24A. On the other hand, in cases in which the projection height H1 exceeds 6 times the spacing W1 at the base 24C, the projection 24 might become liable to tilt over.

Moreover, the projection height H2$a$ of the extension portion 30 of the projection 28 is set within a range of from 0.8 to 6 times the spacing W2$a$ at the base 30C. This thereby enables tilting of the extension portion 30, as well as reflection of light incident to the patterned portion 20, to be suppressed more effectively than in cases in which, for example, the projection height H2$a$ is not within a range of from 0.8 to 6 times the spacing W2$a$.

Note that if the projection height H2$a$ is less than 0.8 times the spacing W2$a$ at the base 30C, light might be reflected strongly by the wall faces 30A. On the other hand, in cases in which the projection height H2$a$ exceeds 6 times the spacing W2$a$ at the base 30C, the extension portion 30 might become liable to tilt over.

The extension portion 31 of the projection 28 also has the same configuration as the extension portion 30, thereby enabling tilting of the extension portion 31, as well as reflection of light incident to the patterned portion 20, to be effectively suppressed.

Moreover, the projection height H3$a$ of the extension portion 34 of the projection 32 is set within a range of from 0.8 to 6 times the spacing W3$a$ at the base 34C. This thereby enables tilting of the extension portion 34, as well as reflection of light incident to the patterned portion 20, to be suppressed more effectively than in cases in which, for example, the projection height H3$a$ is not within a range of from 0.8 to 6 times the spacing W3$a$.

Note that if the projection height H3$a$ is less than 0.8 times the spacing W3$a$ at the base 34C, light might be reflected strongly by the wall faces 34A. On the other hand, in cases in which the projection height H3$a$ exceeds 6 times the spacing W3$a$ at the base 34C, the extension portion 34 might become liable to tilt over.

The extension portions 35, 36 of the projection 32 also have the same configuration as the extension portion 34, thereby enabling tilting of the extension portions 35, 36, as well as reflection of light incident to the patterned portion 20, to be effectively suppressed.

Moreover, in the tire 10, the angle $\theta 1$ of the projection 24 is set within a range of from 5° to 30°. This thereby enables tilting of the projection 24, as well as reflection of light incident to the patterned portion 20, to be suppressed more effectively than in cases in which, for example, the angle $\theta 1$ is not within a range of from 5° to 30°.

Note that if the angle $\theta 1$ is less than 5°, the projection 24 might become liable to tilt over. On the other hand, if the angle $\theta 1$ exceeds 30°, light might be reflected strongly by the wall faces 24A.

Moreover, the angle $\theta 2a$ of the extension portion 30 of the projection 28 is set within a range of from 5° to 30°. This thereby enables tilting of the extension portion 30, as well as reflection of light incident to the patterned portion 20, to be suppressed more effectively than in cases in which, for example, the angle $\theta 2a$ is not within a range of from 5° to 30°.

Note that if the angle $\theta 2a$ is less than 5°, the extension portion 30 might become liable to tilt over. On the other hand, if the angle $\theta 2a$ exceeds 30°, light might be reflected strongly by the wall faces 30A.

The extension portion 31 of the projection 28 also has the same configuration as the extension portion 30, thereby enabling tilting of the extension portion 31, as well as reflection of light incident to the patterned portion 20, to be effectively suppressed.

The angle $\theta 3a$ of the extension portion 34 of the projection 32 is set within a range of from 5° to 30°. This thereby enables tilting of the extension portion 34, as well as reflection of light incident to the patterned portion 20, to be suppressed more effectively than in cases in which, for example, the angle $\theta 3a$ is not within a range of from 5° to 30°.

Note that if the angle $\theta 3a$ is less than 5°, the extension portion 34 might become liable to tilt over. On the other hand, if the angle $\theta 3a$ exceeds 30°, light might be reflected strongly by the wall faces 34A.

The extension portions 35, 36 of the projection 32 also have the same configuration as the extension portion 34, thereby enabling tilting of the extension portions 35, 36, as well as reflection of light incident to the patterned portion 20, to be effectively suppressed.

In the tire 10, the cross-section profile of the extension portion 30 configuring the projection 28 as taken along a direction orthogonal to its extension direction is the same shape as the cross-section profile of the extension portion 31 as taken along a direction orthogonal to its extension direction. Moreover, in the projection 32, the cross-section profile of the extension portion 34 as taken along a direction orthogonal to its extension direction, the cross-section profile of the extension portion 35 as taken along a direction orthogonal to its extension direction, and the cross-section profile of the extension portion 36 as taken along a direction orthogonal to its extension direction are all the same shape as each other. This thereby enables reflection of light to be uniformly suppressed even when light is incident to the patterned portion 20 from different directions. A reduction in contrast between the patterned portion 20 and the design 14 depending on the angle from which the patterned portion 20 is viewed is thus effectively suppressed. Visibility of the patterned portion 20 is enhanced as a result, and visibility of the design 14 including the configuration elements 14A surrounded by the patterned portion 20 is also enhanced.

Moreover, in the tire 10, since molding characteristics of the projections 24, 28, 32 are secured in the manner described above, the respective projections 24, 28, 32 are suppressed from tilting over. This enhances the durability of the projections 24, 28, 32, such that the advantageous effect of suppressing reflection of light incident to the decorative patterned portion 20 is maintained for a long time.

Figure 7:
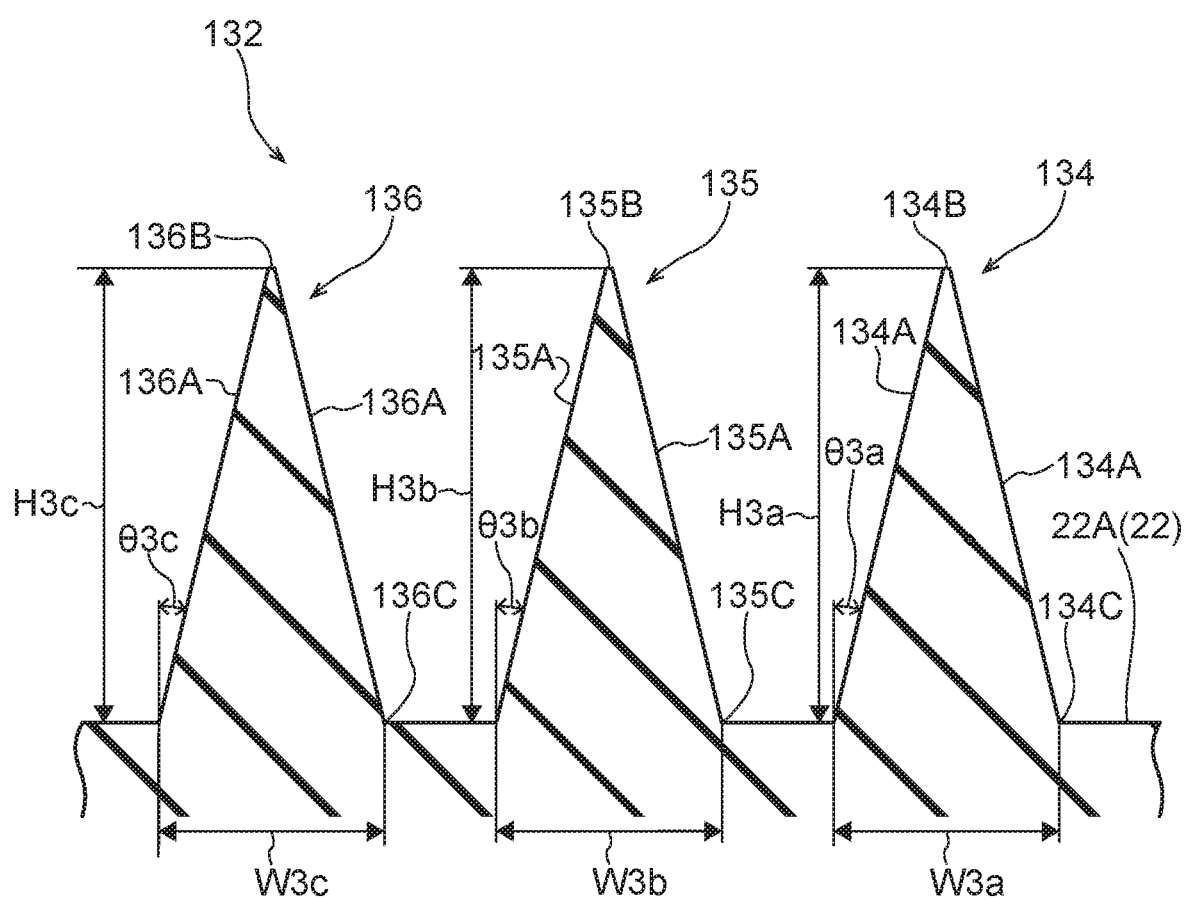
FIG. 7 is a cross-section (a cross-section corresponding to FIG. 6) of a modified example of a second projection employed in a patterned portion of a tire of the first exemplary embodiment of the present invention.

In the first exemplary embodiment, as illustrated in FIG. 6, the apexes 34B, 35B, 36B of the respective extension portions 34, 35, 36 of the projection 32 are flattened as viewed in cross-section taken along directions orthogonal to their respective extension directions. However, the present invention is not limited to such a configuration. For example, as in a projection 132 illustrated in FIG. 7, apexes 134B, 135B, 136B of respective extension portions 134, 135, 136 may have pointed profiles as viewed in cross-section taken along directions orthogonal to their respective extension directions. Configuring such pointed profiles enables reflection of light at the apexes 134B, 135B, 136B to be suppressed. Note that in FIG. 7, wall faces of the extension portions 134, 135, 136 are respectively indicated by the reference numerals 134A, 135A, 136A, and the bases of the extension portions 134, 135, 136 are respectively indicated by the reference numerals 134C, 135C, 136C. Configurations in which the apexes of the extension portions are configured with pointed profiles may also be applied to the extension portions 30, 31 of the projection 24 and the projection 28.

Second Exemplary Embodiment

Next, explanation follows regarding a tire according to a second exemplary embodiment of the present invention. Note that configurations similar to those of the first exemplary embodiment are allocated the same reference numerals, and explanation thereof is omitted as appropriate.

Figure 8:
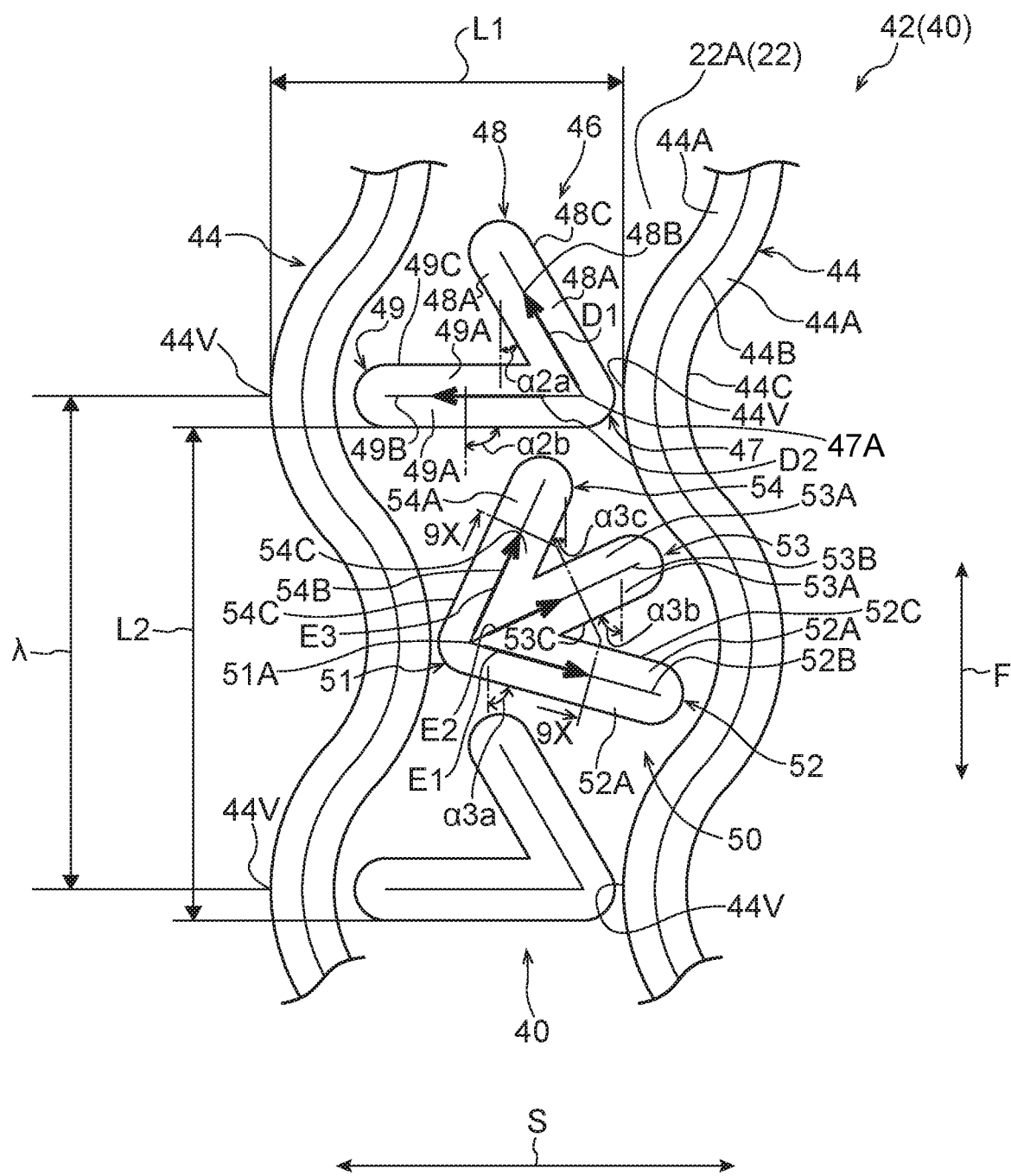
FIG. 8 is an enlarged plan view (an enlarged plan view corresponding to FIG. 3) of part of a patterned portion of a tire of a second exemplary embodiment of the present invention.
Figure 9:
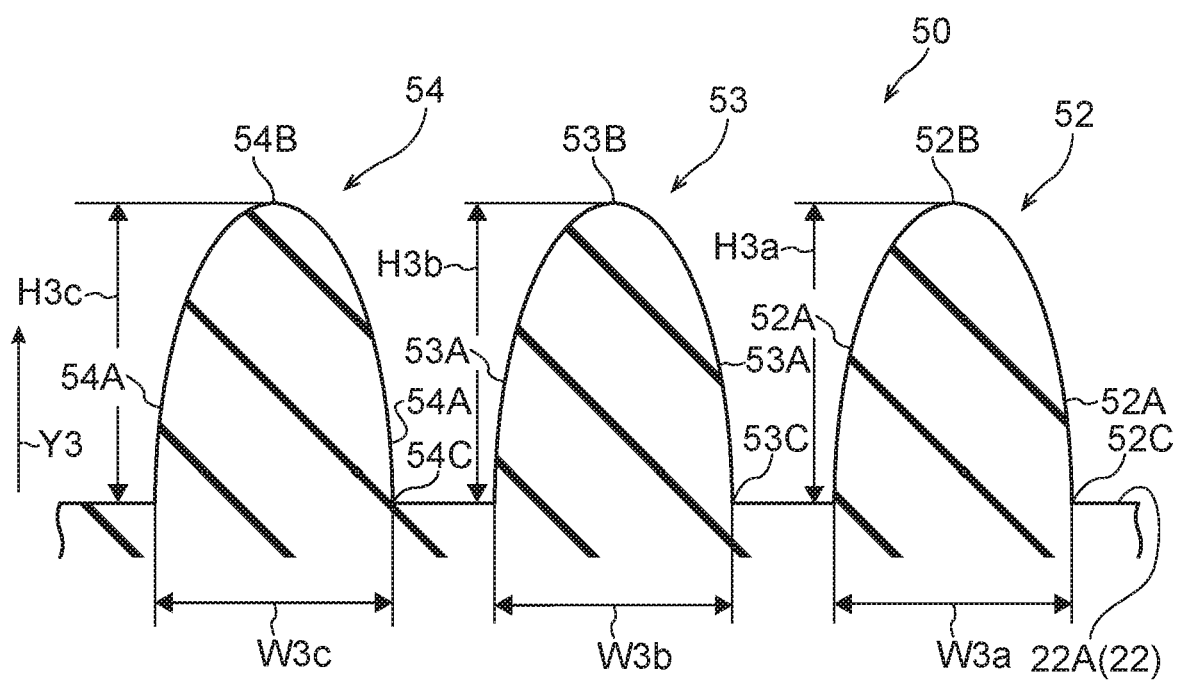
FIG. 9 is a cross-section taken along line 9X-9X in FIG. 8.

As illustrated in FIG. 8 and FIG. 9, a tire 40 of the present exemplary embodiment has the same configuration as the tire 10 of the first exemplary embodiment, with the exception of the cross-section profiles along the extension directions of respective projections configuring a decorative patterned portion 42.

The patterned portion 42 is configured including the recesses 22 of the first exemplary embodiment, as well as projections 44, projections 46, and projections 50.

Note that the projections 44 of the present exemplary embodiment are an example of first projections of the present invention, and the projections 46 and the projections 50 of the present exemplary embodiment are respectively examples of second projections of the present invention.

In plan view, each of the projections 50 includes a bend portion 51 and three extension portions 52, 53, 54 respectively extending from the bend portion 51. The extension portions 52, 53, 54 have the same configuration as the extension portions 34, 35, 36 of the first exemplary embodiment, with the exception of the cross-section profile along their respective extension directions.

As illustrated in FIG. 9, the extension portions 52, 53, 54 of the present exemplary embodiment each have a substantially semi-elliptical cross-section profile along their respective extension directions. Accordingly, respective wall faces 52A, 53A, 54A of the extension portions 52, 53, 54 curve in circular arc shapes, and respective apexes 52B, 53B, 54B curve in circular arc shapes. Note that in FIG. 8 and FIG. 9, bases of the respective extension portions 52, 53, 54 are indicated by the reference numerals 52C, 53C, 54C.

Moreover, in the present exemplary embodiment, the apexes 52B, 53B, 54B of the respective extension portions 52, 53, 54 are respectively contiguous with an apex 51A of the bend portion 51.

The projection 44 has the same configuration as the projection 24 of the first exemplary embodiment, with the exception of the cross-section profile along its extension direction. The projection 44 of the present exemplary embodiment is configured with a substantially semi-elliptical cross-section profile (not illustrated in the drawings) along its extension direction, similarly to the extension portion 52 of the projection 50. Accordingly, wall faces 44A of each projection 44 curve in circular arc shapes, and an apex 44B curves in a circular arc shape. Note that in FIG. 8, a base of the projection 44 is indicated by the reference numeral 44C, and an amplitude portion of the projection 44 is indicated by the reference numeral 44V.

In plan view, each projection 46 includes a bend portion 47, and two extension portions 48, 49 respectively extending from the bend portion 47. The extension portions 48, 49 respectively have the same configuration as the extension portions 30, 31 of the first exemplary embodiment, with the exception of the cross-section profiles along their respective extension directions. The extension portions 48, 49 of the present exemplary embodiment are configured with substantially semi-elliptical cross-section profiles (not illustrated in the drawings) along their respective extension directions, similarly to the extension portions 52 of the projections 50. Accordingly, wall faces 48A, 49A of the respective extension portions 48, 49 curve in circular arc shapes, and apexes 48B, 49B of the respective extension portions 48, 49 respectively curve in circular arc shapes. Note that in FIG. 8, bases of the extension portions 48, 49 are respectively indicated by the reference numerals 48C, 49C.

Moreover, in the present exemplary embodiment, the apexes 48B, 49B of the respective extension portions 48, 49 are respectively contiguous with an apex 47A of the bend portion 47.

Next, explanation follows regarding operation and advantageous effects of the tire 40 of the present exemplary embodiment. Note that explanation regarding operation and advantageous effects obtained through configurations similar to those of the tire 10 of the first exemplary embodiment is omitted.

In the tire 40, the apexes 52B, 53B, 54B of the respective extension portions 52, 53, 54 of the projections 50 configuring the patterned portion 42 are curved in circular arc shapes. Accordingly, the volume of the respective extension portions 52, 53, 54 is increased, enabling tilting of the extension portions 52, 53, 54 to be suppressed in comparison to cases in which, for example, the apexes 52B, 53B, 54B are configured with pointed profiles. In particular, configuring the cross-section profiles of the extension portions 52, 53, 54 with substantially semi-elliptical shapes along their respective extension directions enables tilting of the extension portions 52, 53, 54 to be even better suppressed.

Similarly, configuring the cross-section profiles of the respective extension portions 48, 49 of the projections 44 and the projections 46 configuring the patterned portion 42 as substantially semi-elliptical shapes along their respective extension directions enables tilting to be suppressed.

The advantageous effect of suppressing reflection of light incident to the decorative patterned portion 42 is thereby maintained for a long time.

Moreover, in the tire 40, the wall faces 52A, 53A, 54A of the respective extension portions 52, 53, 54 are curved in circular arc shapes. Namely, since the wall faces 52A, 53A, 54A each have curved faces, light incident to the patterned portion 42 is even more likely to undergo scattering reflection between the respective projections. Light is thus effectively attenuated, further suppressing light reflection. As a result, a large contrast is generated between the patterned portion 42 and the design 14, enhancing the visibility of the patterned portion 42.

Figure 10:
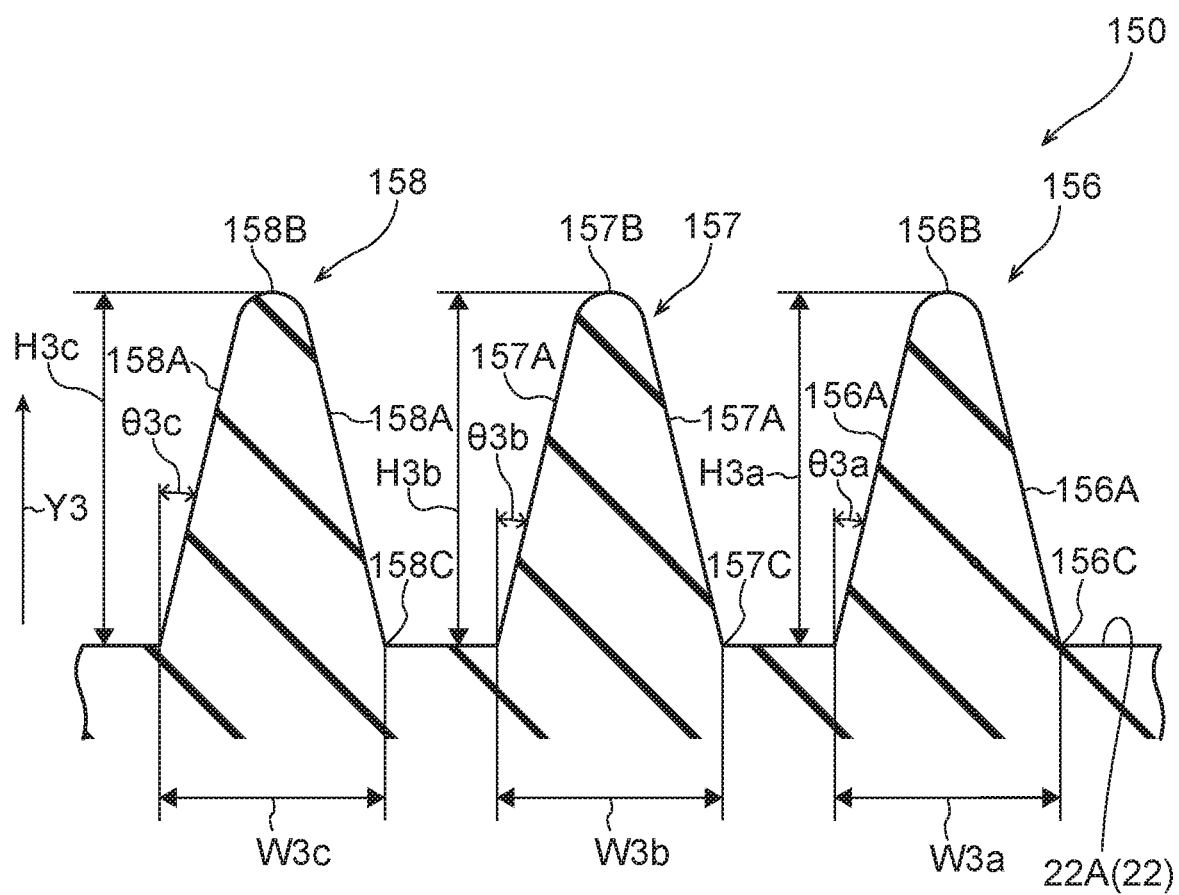
FIG. 10 is a cross-section (a cross-section corresponding to FIG. 9) of a modified example of a second projection employed in a patterned portion of a tire of the second exemplary embodiment of the present invention.

In the second exemplary embodiment, as illustrated in FIG. 9, each of the extension portions 52, 53, 54 of the projection 50 has a substantially semi-elliptical cross-section profile along its respective extension direction. However, the present invention is not limited to such a configuration. For example, as in a projection 150 illustrated in FIG. 10, extension portions 156, 157, 158 configuring the projection 150 may be configured with substantially triangular shaped cross-section profiles along their respective extension directions, with their respective apexes 156B, 157B, 158B being configured curving in circular arc shapes. Note that in FIG. 10, wall faces of the extension portions 156, 157, 158 are respectively indicated by the reference numerals 156A, 157A, 158A, and bases of the extension portions 156, 157, 158 are respectively indicated by the reference numerals 156C, 157C, 158C.

Third Exemplary Embodiment

Next, explanation follows regarding a tire according to a third exemplary embodiment of the present invention. Note that configurations similar to those of the first exemplary embodiment are allocated the same reference numerals, and explanation thereof is omitted as appropriate.

Figure 11:
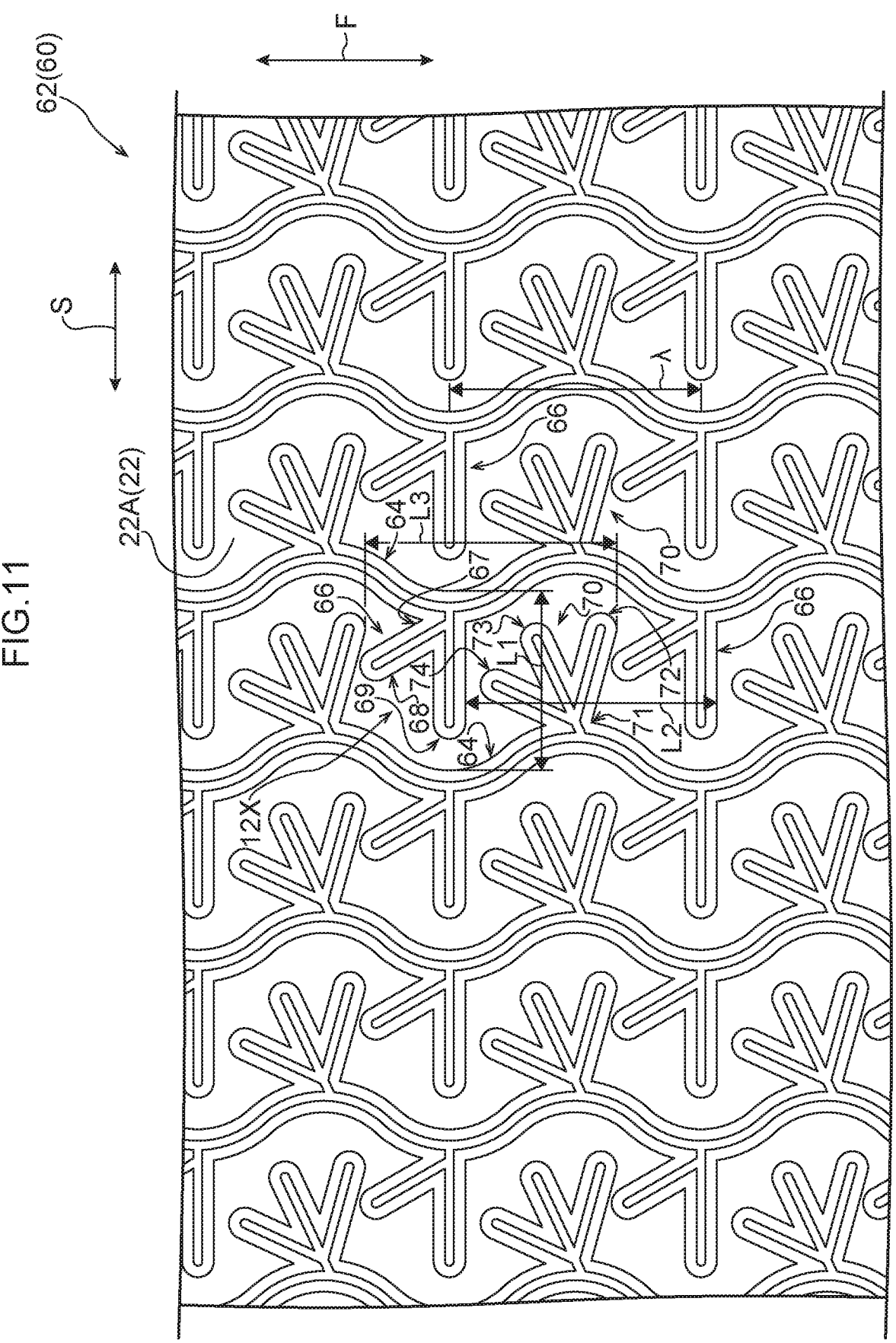
FIG. 11 is a plan view illustrating part of a patterned portion of a tire of a third exemplary embodiment of the present invention.
Figure 12:
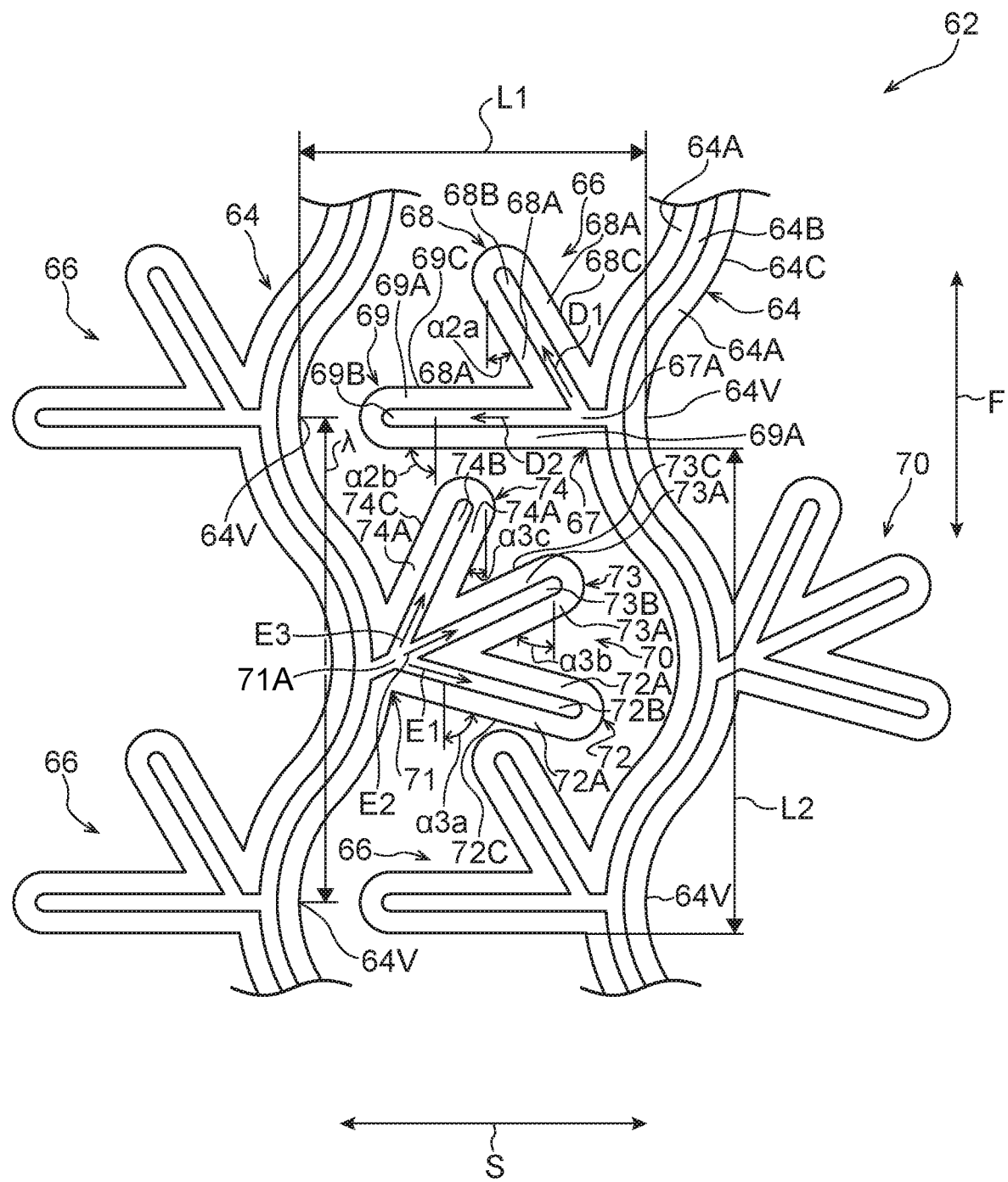
FIG. 12 is an enlarged plan view of the portion indicated by arrow 12X in FIG. 11.

As illustrated in FIG. 11 and FIG. 12, a tire 60 according to the present exemplary embodiment has the same configuration as the tire 10 of the first exemplary embodiment, with the exception of the point that a portion of a projection 66 and a portion of a projection 70 are respectively connected to projections 64 configuring a decorative patterned portion 62.

The patterned portion 62 is configured including the recesses 22 of the first exemplary embodiment, as well as the projections 64, the projections 66, and the projections 70.

Note that the projections 64 of the present exemplary embodiment are an example of first projections of the present invention, and the projections 66 and the projections 70 of the present exemplary embodiment are each examples of second projections of the present invention.

Each projection 64 has the same configuration as the projection 24 of the first exemplary embodiment, with the exception of the point that a bend portion 67 of the projection 66, and a bend portion 71 of the projection 70, described later, are connected to the projection 64. Note that in FIG. 12, wall faces of the projection 64 are indicated by the reference numeral 64A, an apex is indicated by the reference numeral 64B, a base is indicated by the reference numeral 64C, and an amplitude portion is indicated by the reference numeral 64V.

In plan view, each projection 66 includes a bend portion 67 and two extension portions 68, 69. The projection 66 has the same configuration as the projection 28 of the first exemplary embodiment, with the exception of the point that the bend portion 67 is connected to the amplitude portion 64V of the projection 64. Note that in FIG. 12, respective wall faces of the extension portions 68, 69 are indicated by the reference numerals 68A, 69A, respective apexes are indicated by the reference numerals 68B, 69B, and respective bases are indicated by 68C, 69C. Moreover, in the present exemplary embodiment, the respective apexes 68B, 69B of the extension portions 68, 69 are respectively contiguous with an apex 67A of the bend portion 67, and the apex 67A of the bend portion 67 is contiguous with the apex 64A of the projection 64.

In plan view, each projection 70 includes the bend portion 71, and three extension portions 72, 73, 74. The projection 70 has the same configuration as the projections 32 of the first exemplary embodiment, with the exception of the point that the bend portion 71 is connected to the amplitude portion 64V of the projection 64. Note that in FIG. 12, respective wall faces of the extension portions 72, 73, 74 are indicated by the reference numerals 72A, 73A, 74A, respective apexes are indicated by the reference numerals 72B, 73B, 74B, and respective bases are indicated by the reference numerals 72C, 73C 74C. Moreover, in the present exemplary embodiment, the respective apexes 72B, 73B, 74B of the extension portions 72, 73, 74 are each contiguous with an apex 71A of the bend portion 71, and the apex 71A of the bend portion 71 is contiguous with the apex 64A of the projection 64

Moreover, in the present exemplary embodiment, as illustrated in FIG. 12, the bend portion 67 of the projection 66 is connected to the side of one wall face 64A of one of the projections 64 (on the left side in FIG. 12), and the bend portion 71 of the projection 70 is connected to the side of the other wall face 64A of the projection 64 (on the right side in FIG. 12). In other words, the respective bend portions 67, 71 of neighboring projections 66 and projections 70 are connected to either side of the projection 64 separately. Note that the present invention is not limited to the above configuration.

Next, explanation follows regarding operation and advantageous effects of the tire 60 of the present exemplary embodiment. Note that explanation regarding operation and advantageous effects obtained through configurations similar to those of the tire 10 of the first exemplary embodiment is omitted.

In the tire 60, the projections 66 and the projections 70 are arranged between neighboring projections 64. The bend portions 67 of the projections 66 are connected to one of the neighboring projections 64, and the bend portions 71 of the projections 70 are connected to the other of the neighboring projections 64. This facilitates the flow of rubber between molding blades used to mold the projections 66 and between molding blades used to mold the projections 70 from between molding blades used to mold the projections 64 in a mold (not illustrated in the drawings) when molding the tire in the mold (in other words, it is easy for air to escape from between the molding blades). Molding characteristics of the projections 64, the projections 66, and the projections 70 are thereby secured. Namely, molding characteristics of the patterned portion 62 are secured. Reflection of light incident to the decorative patterned portion 62 is thereby suppressed.

Moreover, in the tire 60, the respective bend portions 67, 71 of neighboring projections 66 and projections 70 are separately connected to the projections 64 on either side. Accordingly, the projections 66 and the projections 70 can be arranged with good balance with respect to the projections 64 on either side in comparison to cases in which, for example, the bend portions 67, 71 of the respective neighboring projections 66 and projections 70 are connected to only one projection 64 out of the projections 64 on either side. This thereby enables reflection of light to be even better suppressed even when light is incident to the patterned portion 62 from different directions.

In the projection 66 of the third exemplary embodiment, the bend portion 67 is connected to the projection 64. However, the present invention is not limited to such a configuration. For example, configuration may be made in which a leading end portion of the extension portion 68 or a leading end portion of the extension portion 69 is connected to the projection 64. Moreover, similarly in the projection 70, configuration may be made in which a leading end portion of the extension portion 72, a leading end portion of the extension portion 73, or a leading end portion of the extension portion 74 is connected to the projection 64.

In the projection 70 of the third exemplary embodiment, configuration is made in which the extension portion 73 extends out from the inside of the bend of the bend portion 71. However, the present invention is not limited to such a configuration. For example, configuration may be made in which the extension portion 73 is extended from the outside of the bend of the bend portion 71, and the leading end portion of the extension portion 73 is connected to the projection 64.

Figure 15:
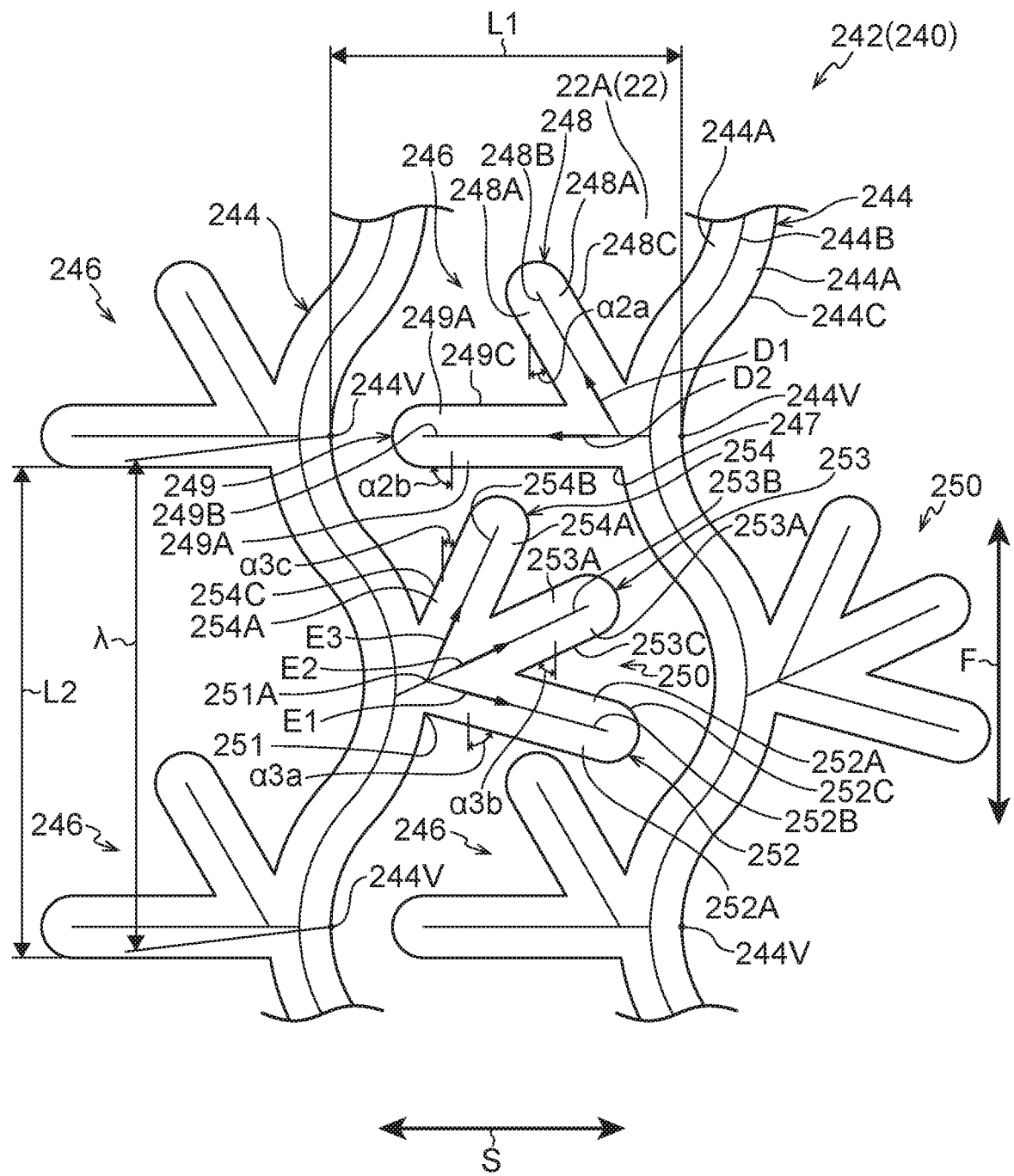
FIG. 15 is an enlarged plan view of part of a patterned portion of a modified example of a tire of the third exemplary embodiment of the present invention.

Note that the configuration of the projection 44, the projection 46, and the projection 50 of the second exemplary embodiment may be applied to the projection 64, the projection 66, and the projection 70 of the third exemplary embodiment. Specifically, as in a tire 240 illustrated in FIG. 15, a patterned portion 242 may be configured by projections 244, 246, 250, and the recesses 22 of the first exemplary embodiment. Note that in the projections 244, the projections 44 of the second exemplary embodiment are applied to the projections 64 of the third exemplary embodiment. In FIG. 15, wall faces of the projections 244 are indicated by the reference numeral 244A, an apex is indicated by the reference numeral 244B, a base is indicated by the reference numeral 244C, and an amplitude portion is indicated by the reference numeral 244V. Moreover, in the projection 246, the projections 46 of the second exemplary embodiment are applied to the projections 66 of the third exemplary embodiment, and in plan view, each projection 246 includes a bend portion 247 and two extension portions 248, 249. The bend portion 247 of each projection 246 is connected to the amplitude portion 244V of the projection 244. Note that in FIG. 15, respective wall faces of the extension portions 248, 249 are indicated by the reference numerals 248A, 249A, respective apexes are indicated by the reference numerals 248B, 249B, and respective bases are indicated by 248C, 249C. Moreover, in the present exemplary embodiment, the apexes 248B, 249B of the respective extension portions 248, 249 are respectively contiguous with an apex 247A of the bend portion 247, and the apex 247A of the bend portion 247 is contiguous with the apex 244A of the projection 244.

Moreover, in the projections 250, the projections 50 of the second exemplary embodiment are applied to the projection 70 of the third exemplary embodiment, and in plan view, each projection 250 includes a bend portion 251 and three extension portions 252, 253, 254. The bend portion 251 of the projection 250 is connected to the amplitude portion 244V of the projection 244. Note that in FIG. 15, respective wall faces of the extension portions 252, 253, 254 are indicated by the reference numerals 252A, 253A, 254A, respective apexes are indicated by the reference numerals 252B, 253B, 254B, and respective bases are indicated by the reference numerals 252C, 253C, 254C. Moreover, in the present exemplary embodiment, the apexes 252B, 253B, 254B of the respective extension portions 252, 253, 254 are respectively contiguous with an apex 251A of the bend portion 251, and the apex 251A of the bend portion 251 is contiguous with the apex 244A of the projection 244.

Other Exemplary Embodiments

In the first exemplary embodiment, plural of the projections 24 are arranged spaced apart in the second direction such that constant spacings are formed between neighboring projections 24, in other words, such that neighboring projections 24 are in phase with each other in the second direction. However, the present invention is not limited to such a configuration, and configuration may be made in which the projections 24 are arranged so as to be out-of-phase in the second direction. For example, configuration may be made in which the projections 24 are arranged along the second direction such that the neighboring projections 24 are in antiphase to one another in the second direction, with the spacings therebetween forming wide portions and narrow portions between the neighboring projections 24, with the second projections of the present invention (for example the projections 28 or the projections 32) being arranged in the wide portions. In such cases, projection components extending in different directions are increased, such that light incident to the patterned portion is more effectively attenuated, and light reflection is thereby further suppressed. The contrast between the patterned portion 20 and the designs 14 is thereby increased, enhancing the visibility of the patterned portion 20. Note that the above configuration may also be applied to the second exemplary embodiment and the third exemplary embodiment.

In the first exemplary embodiment, in plan view, the projections 24 have a sine wave shape. However, the present invention is not limited to such a configuration. For example, each projection 24 may have a straight line shape or a rectangular wave shape in plan view. Note that a configuration in which the projection 24 has a shape other than a sine wave shape in plan view may also be applied to the second exemplary embodiment or the third exemplary embodiment.

In the first exemplary embodiment, configuration is made in which the projections 28 and the projections 32 are arranged alternately between neighboring projections 24. However, the present invention is not limited to such a configuration. For example, plural of the projections 28 alone may be arranged spaced apart from each other between neighboring projections 24, or plural of the projections 32 alone may be arranged spaced apart from each other between neighboring projections 24. Note that the above configuration may also be applied to the second exemplary embodiment or the third exemplary embodiment.

In the projection 32 of the first exemplary embodiment, the extension portion 35 is configured extending from the inside of the bend of the bend portion 33. However, the present invention is not limited to such a configuration. For example, the extension portion 35 may be configured extending from the outside of the bend of the bend portion 33. Note that the above configuration may also be applied to the second exemplary embodiment.

In the first exemplary embodiment, configuration is made in which the projections 28 and the projections 32 are arranged between the neighboring projections 24. However, the present invention is not limited to such a configuration. For example, projections including four or more extension portions may be arranged between the neighboring projections 24. Note that the shapes of the projections arranged between the neighboring projections 24 may also be applied to the second exemplary embodiment or the third exemplary embodiment.

In the first exemplary embodiment, the projections 24, the projections 28, and the projections 32 are each provided projecting from the bottom face 22A of the recess 22. However, the present invention is not limited to such a configuration, and the projections 24, the projections 28, and the projections 32 may each be provided projecting from the surface 12A of the tire side portion 12. Such a configuration in which the projections 24, the projections 28, and the projections 32 project from the surface 12A of the tire side portion 12 may also be applied to the second exemplary embodiment or the third exemplary embodiment.

Figure 13:
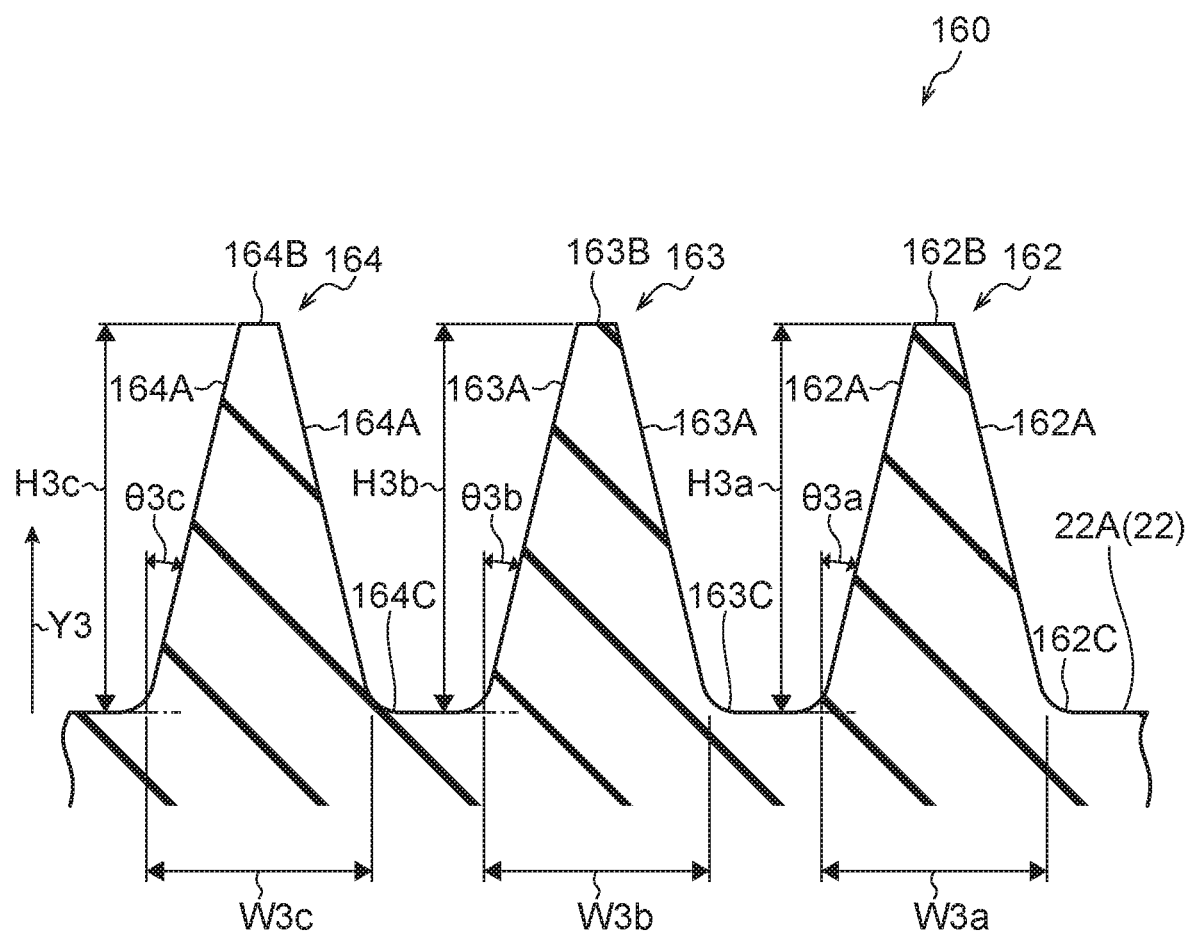
FIG. 13 is a cross-section (a cross-section corresponding to FIG. 6) of a second projection employed in a patterned portion of a tire of another exemplary embodiment of the present invention.

As illustrated in FIG. 6, in the first exemplary embodiment, the wall faces 34A of the extension portion 34 configuring the projection 32 are configured extending in continuous straight line shapes from the apex 34B to the base 34C. However, the present invention is not limited to such a configuration. For example, as in a projection 160 of a modified example illustrated in FIG. 13, wall faces 162A of an extension portion 162 may be configured extending in straight line shapes from an apex 164B toward a base 164C before curving gently partway (in the vicinity of the base 164C in FIG. 13) so as to be contiguous with the bottom face 22A of the recess 22. Moreover, in the projection 160, the extension portions 163, 164 may similarly be configured such that respective wall faces 163A, 164A extend in continuous straight line shapes from apexes 163B, 164B toward bases 163C, 164C, before curving gently partway so as to be contiguous with the bottom face 22A of the recess 22. Applying a gentle curve to respective wall faces 162A, 163A, 164A of extension portions 162, 163, 164 as described above enables reflection of light incident to the patterned portion 20 to be suppressed. Moreover, in cases in which a configuration in which wall faces of the extension portions curve gently at the base side is applied to the projection 24 and the projection 28, reflection of light incident to the patterned portion 20 is effectively suppressed, increasing the contrast between the patterned portion 20 and the designs 14, and thus further enhancing the visibility of the patterned portion 20. A configuration in which wall faces of the extension portions curve gently at the base side may also be applied to the second exemplary embodiment or the third exemplary embodiment.

In the tire 10 of the first exemplary embodiment, as illustrated in FIG. 2, configuration is made in which the projections 28 are arranged at the placement pitch L2 between neighboring projections 24, and the projections 32 are arranged at the placement pitch L3 between neighboring projections 24. However, the present invention is not limited to such a configuration, and configuration may be made in which the projections 28 and the projections 32, these being examples of the second projections of the present invention, have a non-regular arrangement between neighboring projections 24 (for example, are arranged such that the placement pitch is not uniform). In such cases, reflection of light can be suppressed even when light is incident to the patterned portion 20 from different directions, enabling similar advantageous effects to those of the first exemplary embodiment to be obtained. The above configuration may also be applied to the second exemplary embodiment or the third exemplary embodiment.

Figure 14:
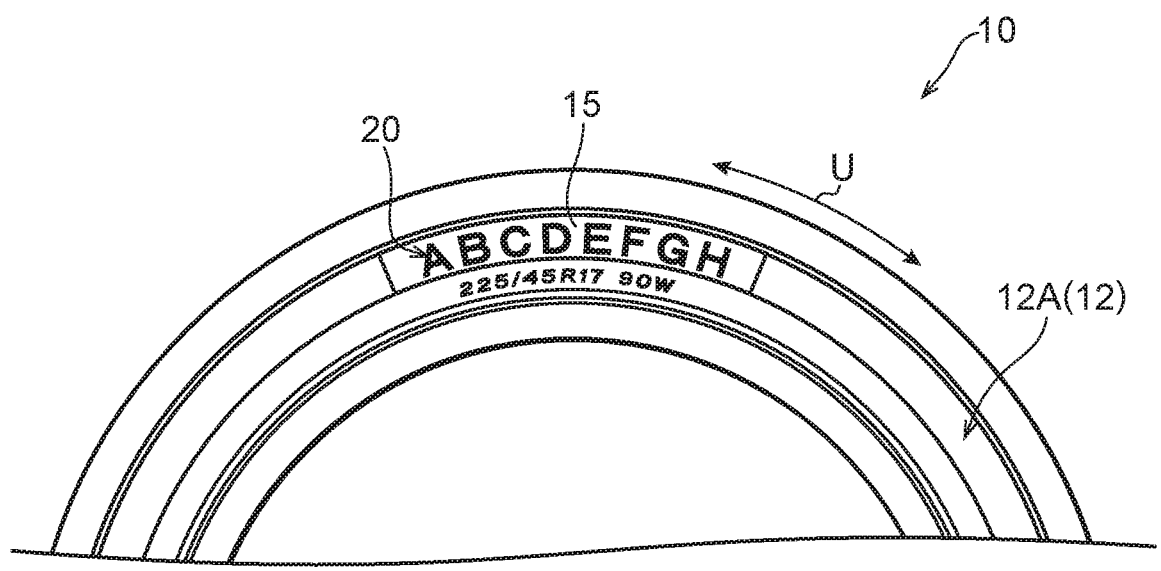
FIG. 14 is an enlarged side view of part of a tire of another exemplary embodiment of the present invention.

As illustrated in FIG. 1, in the tire 10 of the first exemplary embodiment, configuration is made in which the configuration elements 14A of the design 14 are surrounded by the decorative patterned portions 20. However, the present invention is not limited to such a configuration. For example, as illustrated in FIG. 14, configuration elements of a design may be formed by the patterned portion 20, and portions adjacent to the patterned portion 20 may be configured by a smooth portion 15. Note that a configuration in which the configuration elements of the design are formed by the patterned portion 20 may also be applied to the tire 40 of the second exemplary embodiment or the tire 60 of the third exemplary embodiment.

In the first exemplary embodiment, the decorative patterned portion 20 is formed on the surface 12A of the tire side portion 12. However, the present invention is not limited to such a configuration. For example, the patterned portion 20 may be formed on a groove bottom face of a water escape groove, not illustrated in the drawings, that is formed to a tread surface in addition to, or instead of, on the surface 12A. Specifically, the patterned portion 20 may be formed to the groove bottom face of a continuous groove extending in the tire circumferential direction. Note that in the present invention, the "tire surface" encompasses faces that can be seen as viewed from outside the tire. Accordingly, tire surfaces also encompass groove bottom faces of grooves formed to the tread surface. Note that a configuration in which the patterned portion is formed to a groove bottom face of a groove formed in the tread surface may also be applied to the second exemplary embodiment or the third exemplary embodiment.

In the first exemplary embodiment, the tire 10 is a pneumatic tire. However, the present invention is not limited to such a configuration, and the tire 10 may be a solid tire. Similarly, the tire 40 of the second exemplary embodiment and the tire 60 of the third exemplary embodiment may also be solid tires.

Explanation has been given regarding exemplary embodiments for implementing the present invention. However, the exemplary embodiments herein are merely examples of the present invention, and various modifications may be implemented within a range not departing from the spirit of the present invention. Moreover, it goes without saying that the scope of rights of the present invention are not limited by the exemplary embodiments herein.

Note that the disclosures of Japanese Patent Application No. 2015-099525 filed on May 14, 2015, Japanese Patent Application No. 2015-099526 filed on May 14, 2015, Japanese Patent Application No. 2015-099527 filed on May 14, 2015, Japanese Patent Application No. 2015-099528 filed on May 14, 2015, Japanese Patent Application No. 2015-099531 filed on May 14, 2015, and Japanese Patent Application No. 2015-099537 filed on May 14, 2015, are incorporated in their entirety by reference herein.

All cited documents, patent applications, and technical standards mentioned in the present specification are incorporated by reference in the present specification to the same extent as if the individual cited document, patent application, or technical standard was specifically and individually indicated to be incorporated by reference.

The following supplements are also disclosed with respect to the exemplary embodiments described above.

The following supplements are also disclosed in relation to the exemplary embodiments described above.

Supplement 1

A tire including a decorative patterned portion that is formed on a tire surface, and that is configured including plural first projections extending in a first direction in plan view and arranged spaced apart from each other in a second direction orthogonal to the first direction, and plural second projections arranged between neighboring first projections and arranged spaced apart from each other in the first direction, wherein:

in plan view, each of the second projections includes a bend portion and plural extension portions extending from the bend portion.

In the tire of Supplement 1, the decorative patterned portion configured including the first projections and the second projections is formed on the tire surface. In the patterned portion, incident light is attenuated while being reflected back and forth between the respective projections, thereby suppressing light reflection. Accordingly, for example, in cases in which a smooth portion is formed adjacent to the patterned portion, a large contrast is generated between the patterned portion and the smooth portion, thereby enhancing the visibility of the patterned portion.

In the above tire, since the first projections extend along the first direction in plan view, the flow of rubber in between blades used to mold the first projections when molding the tire in a mold is facilitated (in other words, it is easier for air to escape from between the blades used to form the first projections) in comparison to, for example, configurations in which the first projections do not extend along a single direction and are instead staggered. Molding characteristics of the first projections (patterned portion) are thus secured.

Moreover, in the above tire, in plan view plural of the second projections are arranged between neighboring first projections and arranged spaced apart from each other in the first direction. Accordingly, in comparison to configurations in which, for example, the second projections are not arranged between neighboring first projections, the incident light is attenuated while being reflected back and forth between the second projections even when light is incident to the patterned portion from a specific direction (for example, a direction orthogonal to the second direction), thereby suppressing light reflection. Namely, light reflection can be suppressed even when light is incident to the patterned portion from different directions. Accordingly, for example, in cases in which a smooth portion is formed adjacent to the patterned portion, a reduction in contrast between the patterned portion and the smooth portion depending on the angle from which the patterned portion is viewed is suppressed.

Moreover, in the above tire, in plan view the second projections each include plural extension portions extending from the bend portion, thereby increasing the projection components extending in different directions. Light incident to the patterned portion is thus more effectively attenuated, and light reflection is further suppressed.

Supplement 2

The tire of Supplement 1, wherein, in plan view, each of the first projections has a shape having an amplitude in the second direction.

In the tire of Supplement 2, in plan view each of the first projections has a shape having an amplitude in the second direction. Accordingly, light incident to the patterned portion more readily undergoes scattering reflection between the respective projections than in cases in which, for example, the first projections have shapes extending in straight line shapes along the first direction in plan view. Light reflection is thereby further suppressed. Accordingly, for example, in cases in which a smooth portion is formed adjacent to the patterned portion, even greater contrast is generated between the patterned portion and the smooth portion, thereby enhancing the visibility of the patterned portion.

Supplement 3

The tire of Supplement 2, wherein, in plan view, each of the first projections has a sine wave shape.

In the tire of Supplement 3, in plan view each of the first projections has a sine wave shape. Accordingly, since wall faces of the first projections include curved faces, light incident to the patterned portion even more readily undergoes scattering reflection between the respective projections, and light is more effectively attenuated, than in configurations in which, for example, the first projections have rectangular wave shapes in plan view. Light reflection is thus further suppressed.

Supplement 4

The tire of Supplement 2 or Supplement 3, wherein a spacing between neighboring first projections is constant.

In the tire of Supplement 4, the spacing between neighboring first projections is constant. This thereby enables reflection of light incident to the patterned portion from different directions to be more uniformly suppressed than in cases in which, for example, spacings between neighboring first projections are not constant. Moreover, molding characteristics of the second projections arranged between the neighboring first projections are easy to secure.

Supplement 5

The tire of any one out of Supplements 1 to 4, wherein, in plan view, each of the extension portions extends in a direction intersecting the first direction.

In the tire of Supplement 5, in plan view, each of the extension portions of the second projections extends in a direction intersecting the first direction. Accordingly, projection components extending in different directions are increased in comparison to cases in which, for example, the extension portions of the second projections extend along the first direction in plan view. Light incident to the patterned portion is thus more effectively attenuated between the respective projections, and light reflection is further suppressed.

Note that here, a "direction intersecting the first direction in plan view" includes both directions inclined with respect to the first direction in plan view, and directions orthogonal to the first direction in plan view.

Moreover, since the second projections each include plural of the extension portions extending in directions intersecting the first direction in plan view, projection components extending in different directions are increased, and light incident to the patterned portion is more effectively attenuated, such that light reflection is further suppressed. Accordingly, in cases in which a smooth portion is formed adjacent to the patterned portion, an even greater contrast is generated between the patterned portion and the smooth portion, further enhancing the visibility of the patterned portion.

Supplement 6

The tire of Supplement 5, wherein, in plan view, angles in neighboring second projections formed by each of the extension portions with respect to the first direction differ from each other.

In the tire of Supplement 6, in plan view angles in neighboring second projections formed by each of the extension portions with respect to the first direction differ from each other. Accordingly, projection components extending in different directions are increased in comparison to cases in which, for example, angles in neighboring second projections formed by each of the extension portions with respect to the first direction do not differ from each other. Light incident to the patterned portion is thus more effectively attenuated, and light reflection is further suppressed. Accordingly, in cases in which a smooth portion is formed adjacent to the patterned portion, for example, an even greater contrast is generated between the patterned portion and the smooth portion, further enhancing the visibility of the patterned portion.

Supplement 7

The tire of any one out of Supplements 1 to 6, wherein:
a placement pitch of the first projections is within a range of from 0.5 mm to 1 mm; and
projection direction heights of the first projections and the second projections are each within a range of from 0.1 mm to 1 mm.

In the tire of Supplement 7, the placement pitch of the first projections is within a range of from 0.5 mm to 1 mm, and the projection direction heights of the first projections and the second projections are each within a range of from 0.1 mm to 1 mm. Accordingly, in comparison to cases in which, for example, the placement pitch of the first projections is not within a range of from 0.5 mm to 1 mm, and the projection direction heights of the first projections and the second projections are not each within a range of from 0.1 mm to 1 mm, light incident to the patterned portion is attenuated while being reflected back and forth between the respective projections, such that light reflection is further suppressed.

Supplement 8

The tire of any one out of Supplements 1 to 7, wherein the tire surface is a surface of a tire side portion; and a smooth portion surrounded by the patterned portion is formed on the surface of the tire side portion.

In the tire of Supplement 8, the smooth portion formed on the surface of the tire side portion is surrounded by the patterned portion, thereby generating a large contrast between the smooth portion and the patterned portion. This enhances the visibility of the patterned portion and also enhances the visibility of the smooth portion surrounded by the patterned portion.

Supplement 9

A tire including a decorative patterned portion that is formed on a tire surface, and that is configured including plural first projections extending in a first direction in plan view and arranged spaced apart from each other in a second direction orthogonal to the first direction, and plural second projections arranged between neighboring first projections and arranged spaced apart from each other in the first direction, wherein:

in plan view each of the second projections includes a bend portion and plural extension portions extending from the bend portion, and includes a portion connected to one of the first projections.

In the tire of Supplement 9, the decorative patterned portion configured including the first projections and the second projections is formed on the tire surface. In the patterned portion, incident light is attenuated while being reflected back and forth between the respective projections, thereby suppressing light reflection. Accordingly, for example, in cases in which a smooth portion is formed adjacent to the patterned portion, a large contrast is generated between the patterned portion and the smooth portion, thereby enhancing the visibility of the patterned portion.

In the above tire, since the first projections extend along the first direction in plan view, the flow of rubber in between blades used to mold the first projections when molding the tire in a mold is facilitated (in other words, it is easier for air to escape from between the blades used to form the first projections) in comparison to, for example, configurations in which the first projections do not extend along a single direction and are instead staggered. Molding characteristics of the first projections (patterned portion) are thus secured.

Moreover, in the above tire, in plan view plural of the second projections are arranged between neighboring first projections and arranged spaced apart from each other in the first direction. Accordingly, in comparison to configurations in which, for example, the second projections are not arranged between neighboring first projections, the incident light is attenuated while being reflected back and forth between the second projections even when light is incident to the patterned portion from a specific direction (for example, a direction orthogonal to the second direction), thereby suppressing light reflection. Namely, light reflection can be suppressed even when light is incident to the patterned portion from different directions. Accordingly, for example, in cases in which a smooth portion is formed adjacent to the patterned portion, a reduction in contrast between the patterned portion and the smooth portion depending on the angle from which the patterned portion is viewed is suppressed.

Moreover, in the above tire, in plan view the second projections each include plural extension portions extending from the bend portion, thereby increasing the projection components extending in different directions. Light incident to the patterned portion is thus more effectively attenuated, and light reflection is further suppressed.

Moreover, in the above tire, a portion of each of the second projections is connected to one of the first projections. Accordingly, the flow of rubber from between blades used to mold the first projections to between blades used to mold the second projections when molding the tire in a mold is facilitated (in other words, it is easier for air to escape from between the blades used to form the respective projections) in comparison to, for example, configurations in which the second projections are discrete from the first projections. Molding characteristics of the second projections are thus secured. Namely, molding characteristics of the patterned portion are secured. Reflection of light incident to the patterned portion can thus be further suppressed. Accordingly, for example, in cases in which a smooth portion is formed adjacent to the patterned portion, even greater contrast is generated between the patterned portion and the smooth portion, thus enhancing the visibility of the patterned portion.

Supplement 10

The tire of Supplement 9, wherein, in plan view, each of the extension portions extends in a direction intersecting the first direction.

In the tire of Supplement 10, in plan view each of the extension portions of the second projections extends in a direction intersecting the first direction. Accordingly, projection components extending in different directions are increased in comparison to cases in which, for example, the extension portions of the second projections extend along the first direction in plan view. Light incident to the patterned portion is thus more effectively attenuated between the respective projections, and light reflection is further suppressed.

Supplement 11

The tire of Supplement 10, wherein the bend portion of each of the second projections is connected to one of the first projections.

In the tire of Supplement 11, the bend portion of each of the second projections is connected to one of the first projections. Accordingly, when molding the tire in a mold, the flow of rubber from between blades used to mold the first projections to between blades used to mold the extension portions of the second projections via the bend portions is facilitated (in other words, it is easy for air to escape from between the blades used to form the extension portions). Molding characteristics of the second projections are thus secured. Namely, molding characteristics of the patterned portion are secured. Reflection of light incident to the patterned portion is thus further suppressed.

Supplement 12

The tire of Supplement 11, wherein, in neighboring second projections, the respective bend portions are connected to different first projections from each other.

In the tire of Supplement 12, in neighboring second projections, the respective bend portions are connected to different first projections from each other. This thereby enables reflection of light to be suppressed even when light is incident to the patterned portion from different directions in comparison to cases in which in neighboring second projections, the respective bend portions are connected to the same first projection as each other.

Supplement 13

The tire of any one out of Supplements 10 to 12, wherein, in plan view, angles in neighboring second projections formed by each of the extension portions with respect to the first direction differ from each other.

In the tire of Supplement 13, in plan view angles in neighboring second projections formed by each of the extension portions with respect to the first direction differ from each other. Accordingly, projection components extending in different directions are increased in comparison to cases in which, for example, angles in neighboring second projections formed by each of the extension portions with respect to the first direction do not differ from each other. Light incident to the patterned portion is more effectively attenuated, and light reflection is further suppressed. Accordingly, for example, in cases in which a smooth portion is formed adjacent to the patterned portion, an even greater contrast is generated between the patterned portion and the smooth portion, further enhancing the visibility of the patterned portion.

Supplement 14

The tire of any one out of Supplements 9 to 13, wherein:

a placement pitch of the first projections is within a range of from 0.5 mm to 1 mm; and projection direction heights of the first projections and the second projections are each within a range of from 0.1 mm to 1 mm.

In the tire of Supplement 14, the placement pitch of the first projections is within a range of from 0.5 mm to 1 mm, and the projection direction heights of the first projections and the second projections are each within a range of from 0.1 mm to 1 mm. Accordingly, in comparison to cases in which, for example, the placement pitch of the first projections is not within a range of from 0.5 mm to 1 mm, and the projection direction heights of the first projections and the second projections are not each within a range of from 0.1 mm to 1 mm, light incident to the patterned portion is attenuated while being reflected back and forth between the respective projections, such that light reflection is further suppressed.

Supplement 15

The tire of any one of Supplement 9 to Supplement 14, wherein the tire surface is a surface of a tire side portion; and a smooth portion surrounded by the patterned portion is formed on the surface of the tire side portion.

In the tire of Supplement 15, the smooth portion formed on the surface of the tire side portion is surrounded by the patterned portion, thereby generating a large contrast between the smooth portion and the patterned portion. This enhances the visibility of the patterned portion and also enhances the visibility of the smooth portion surrounded by the patterned portion.

Supplement 16

A tire including a decorative patterned portion that is formed on a tire surface, and that is configured including plural first projections extending in a first direction in plan view and arranged spaced apart from each other in a second direction orthogonal to the first direction, and plural second projections arranged between neighboring first projections and arranged spaced apart from each other in the first direction, wherein:

in plan view each of the second projections includes a bend portion and plural extension portions extending from the bend portion, and is discrete from the first projections.

In the tire of Supplement 16, the decorative patterned portion configured including the first projections and the second projections is formed on the tire surface. In the patterned portion, incident light is attenuated while being reflected back and forth between the respective projections, thereby suppressing light reflection. Accordingly, for example, in cases in which a smooth portion is formed adjacent to the patterned portion, a large contrast is generated between the patterned portion and the smooth portion, thereby enhancing the visibility of the patterned portion.

In the above tire, since the first projections extend along the first direction in plan view, the flow of rubber in between blades used to mold the first projections when molding the tire in a mold is facilitated (in other words, it is easier for air to escape from between the blades used to form the first projections) in comparison to, for example, configurations in which the first projections do not extend along a single direction and are instead staggered. Molding characteristics of the first projections (patterned portion) are thus secured.

Moreover, in the above tire, in plan view plural of the second projections are arranged between neighboring first projections and arranged spaced apart from each other in the first direction. Accordingly, in comparison to configurations in which, for example, the second projections are not arranged between neighboring first projections, the incident light is attenuated while being reflected back and forth between the second projections even when light is incident to the patterned portion from a specific direction (for example, a direction orthogonal to the second direction), thereby suppressing light reflection. Namely, light reflection can be suppressed even when light is incident to the patterned portion from different directions. Accordingly, for example, in cases in which a smooth portion is formed adjacent to the patterned portion, a reduction in contrast between the patterned portion and the smooth portion depending on the angle from which the patterned portion is viewed is suppressed.

Moreover, in the above tire, in plan view the second projections each include plural extension portions extending from the bend portion, thereby increasing the projection components extending in different directions. Light incident to the patterned portion is thus more effectively attenuated, and light reflection is further suppressed.

Moreover, in the above tire, the second projections are configured discretely to the first projections. Accordingly, when molding the tire in a mold, rubber flows in between blades used to mold the first projections and between blades used to mold the second projections separately, thus increasing the rubber filling speed and enabling a reduction in molding time in comparison to configurations in which, for example, portions of the second projections are continuous to the first projections. Moreover, since the second projections are configured discretely to the first projections, light incident to the patterned portion is reflected back and forth at deeper portions (projection base side (bottom side)) between the first projections and the second projections, thereby effectively suppressing reflection of light.

Supplement 17

The tire of Supplement 16, wherein, in plan view, each of the extension portions extends in a direction intersecting the first direction.

In the tire of Supplement 17, in plan view each of the extension portions of the second projections extends in a direction intersecting the first direction. Accordingly, projection components extending in different directions are increased in comparison to cases in which, for example, the extension portions of the second projections extend along the first direction in plan view. Light incident to the patterned portion is thus more effectively attenuated between the respective projections, and light reflection is further suppressed.

Moreover, each of the second projections includes plural of the extension portions extending in directions intersecting the first direction in plan view. Accordingly, projection components extending in different directions are increased, such that light incident to the patterned portion is more effectively attenuated, and light reflection is further suppressed. Accordingly, for example, in cases in which a smooth portion is formed adjacent to the patterned portion, an even greater contrast is generated between the patterned portion and the smooth portion, further enhancing the visibility of the patterned portion.

Supplement 18

The tire of Supplement 17, wherein, in plan view, angles in neighboring second projections formed by each of the extension portions with respect to the first direction differ from each other.

In the tire of Supplement 18, in plan view angles in neighboring second projections formed by each of the extension portions with respect to the first direction differ from each other. Accordingly, projection components extending in different directions are increased in comparison to cases in which, for example, angles in neighboring second projections formed by each of the extension portions with respect to the first direction do not differ from each other. Light incident to the patterned portion is more effectively attenuated, and light reflection is further suppressed. Accordingly, for example, in cases in which a smooth portion is formed adjacent to the patterned portion, an even greater contrast is generated between the patterned portion and the smooth portion, further enhancing the visibility of the patterned portion.

Supplement 19

The tire of any one out of Supplements 16 to 18, wherein, in plan view, each of the first projections has a shape having an amplitude in the second direction.

In the tire of Supplement 19, in plan view each of the first projections has a shape having an amplitude in the second direction. Accordingly, light incident to the patterned portion more readily undergoes scattering reflection between the respective projections than in cases in which, for example, the first projections have shapes extending in straight line shapes along the first direction in plan view. Light reflection is thereby further suppressed. Accordingly, for example, in cases in which a smooth portion is formed adjacent to the patterned portion, even greater contrast is generated between the patterned portion and the smooth portion, thereby enhancing the visibility of the patterned portion.

Supplement 20

The tire of Supplement 19, wherein, in plan view, each of the first projections has a sine wave shape.

In the tire of Supplement 20, in plan view each of the first projections has a sine wave shape. Accordingly, since wall faces of the first projections include curved faces, light incident to the patterned portion even more readily undergoes scattering reflection between the respective projections, and light is more effectively attenuated, than in configurations in which, for example, the first projections have rectangular wave shapes in plan view. Light reflection is thus further suppressed.

Supplement 21

The tire of any one out of Supplements 16 to 20, wherein: a placement interval of the first projections is within a range of from 0.5 mm to 1 mm; and projection direction heights of the first projections and the second projections are each within a range of from 0.1 mm to 1 mm.

In the tire of Supplement 21, the placement pitch of the first projections is within a range of from 0.5 mm to 1 mm, and the projection direction heights of the first projections and the second projections are each within a range of from 0.1 mm to 1 mm. Accordingly, in comparison to cases in which, for example, the placement pitch of the first projections is not within a range of from 0.5 mm to 1 mm, and the projection direction heights of the first projections and the second projections are not each within a range of from 0.1 mm to 1 mm, light incident to the patterned portion is attenuated while being reflected back and forth between the respective projections, such that light reflection is further suppressed.

Supplement 22

The tire of any one out of Supplements 16 to 21, wherein the tire surface is a surface of a tire side portion; and a smooth portion surrounded by the patterned portion is formed on the surface of the tire side portion.

In the tire of Supplement 22, the smooth portion formed on the surface of the tire side portion is surrounded by the patterned portion, thereby generating a large contrast between the smooth portion and the patterned portion. This enhances the visibility of the patterned portion and also enhances the visibility of the smooth portion surrounded by the patterned portion.

Supplement 23

A tire including a decorative patterned portion that is formed on a tire surface, and that is configured including plural first projections extending in a first direction in plan view and arranged spaced apart from each other in a second direction orthogonal to the first direction, and plural second projections arranged between neighboring first projections and arranged spaced apart from each other in the first direction, wherein:

in plan view each of the second projections includes a bend portion and plural extension portions, each extension portion extending from the bend portion in a direction intersecting the first direction; and in plan view, in neighboring second projections in the first direction, angles formed by each of the extension portions with respect to the first direction differ from each other, or projection shapes of the second projections differ from each other.

In the tire of Supplement 23, the decorative patterned portion configured including the first projections and the second projections is formed on the tire surface. In the patterned portion, incident light is attenuated while being reflected back and forth between the respective projections, thereby suppressing light reflection. Accordingly, for example, in cases in which a smooth portion is formed adjacent to the patterned portion, a large contrast is generated between the patterned portion and the smooth portion, thereby enhancing the visibility of the patterned portion.

In the above tire, since the first projections extend along the first direction in plan view, the flow of rubber in between blades used to mold the first projections when molding the tire in a mold is facilitated (in other words, it is easier for air to escape from between the blades used to form the first projections) in comparison to, for example, configurations in which the first projections do not extend along a single direction and are instead staggered. Molding characteristics of the first projections (patterned portion) are thus secured.

Moreover, in the above tire, in plan view plural of the second projections are arranged between neighboring first projections and arranged spaced apart from each other in the first direction. Accordingly, in comparison to configurations in which, for example, the second projections are not arranged between neighboring first projections, the incident light is attenuated while being reflected back and forth between the second projections even when light is incident to the patterned portion from a specific direction (for example, a direction orthogonal to the second direction), thereby suppressing light reflection. Namely, light reflection can be suppressed even when light is incident to the patterned portion from different directions. Accordingly, for example, in cases in which a smooth portion is formed adjacent to the patterned portion, a reduction in contrast between the patterned portion and the smooth portion depending on the angle from which the patterned portion is viewed is suppressed.

Moreover, in the above tire, in plan view the second projections each include plural extension portions extending from the bend portion. Each extension portion extends in a direction intersecting the first direction, thereby increasing the projection components extending in different directions in comparison to configurations in which the second projections include extension portions that extend along the first direction in plan view. Light incident to the patterned portion is thus more effectively attenuated between the respective projections, and light reflection is further suppressed. Accordingly, for example, in cases in which a smooth portion is formed adjacent to the patterned portion, even greater contrast is generated between the patterned portion and the smooth portion, thereby enhancing the visibility of the patterned portion.

Moreover, in the above tire, in plan view, angles in the second projections neighboring in the first direction formed by each of the extension portions with respect to the first direction differ from each other, or projection shapes of the second projections differ from each other. Accordingly, projection components extending in different directions are increased in comparison to cases in which, for example, configuration is not made in which angles in the second projections neighboring in the first direction formed by each of the extension portions with respect to the first direction differ from each other, or projection shapes of the second projections differ from each other. Light incident to the patterned portion is more effectively attenuated, and light reflection is further suppressed. Accordingly, for example, in cases in which a smooth portion is formed adjacent to the patterned portion, an even greater contrast is generated between the patterned portion and the smooth portion, further enhancing the visibility of the patterned portion.

Supplement 24

The tire of Supplement 23, wherein, in plan view, the second projections have a non-regular arrangement between neighboring first projections.

In the tire of Supplement 24, in plan view the second projections have a non-regular arrangement between neighboring first projections, thereby enabling reflection of light to be suppressed even when light is incident to the patterned portion from different directions. Accordingly, for example, in cases in which a smooth portion is formed adjacent to the patterned portion, a reduction in contrast between the patterned portion and the smooth portion depending on the angle from which the patterned portion is viewed is suppressed.

Note that the "non-regular arrangement" referred to here encompasses arrangements in which a placement pitch of the second projections in the first direction is not constant, and arrangements in which the positions of neighboring second projections differ with respect to the second direction.

Supplement 25

The tire of either Supplement 23 or Supplement 24, wherein, in plan view, each of the first projections has a shape having an amplitude in the second direction.

In the tire of Supplement 25, in plan view each of the first projections has a shape having an amplitude in the second direction. Accordingly, light incident to the patterned portion more readily undergoes scattering reflection between the respective projections than in cases in which, for example, the first projections have shapes extending in straight line shapes along the first direction in plan view. Light reflection is thereby further suppressed.

Accordingly, for example, in cases in which a smooth portion is formed adjacent to the patterned portion, even greater contrast is generated between the patterned portion and the smooth portion, thereby enhancing the visibility of the patterned portion.

Supplement 26

The tire of Supplement 25, wherein, in plan view, each of the first projections has a sine wave shape.

In the tire of Supplement 26, in plan view, each of the first projections has a sine wave shape. Accordingly, since wall faces of the first projections include curved faces, light incident to the patterned portion even more readily undergoes scattering reflection between the respective projections, and light is more effectively attenuated, than in configurations in which, for example, the first projections have rectangular wave shapes in plan view. Light reflection is thus further suppressed.

Supplement 27

The tire of any one out of Supplements 23 to 26, wherein:
a placement pitch of the first projections is within a range of from 0.5 mm to 1 mm; and
projection direction heights of the first projections and the second projections are each within a range of from 0.1 mm to 1 mm.

In the tire of Supplement 27, the placement pitch of the first projections is within a range of from 0.5 mm to 1 mm, and the projection direction heights of the first projections and the second projections are each within a range of from 0.1 mm to 1 mm. Accordingly, in comparison to cases in which, for example, the placement pitch of the first projections is not within a range of from 0.5 mm to 1 mm, and the projection direction heights of the first projections and the second projections are not each within a range of from 0.1 mm to 1 mm, light incident to the patterned portion is attenuated while being reflected back and forth between the respective projections, such that light reflection is further suppressed.

Supplement 28

The tire of any one of Supplement 23 to Supplement 27, wherein the tire surface is a surface of a tire side portion; and
a smooth portion surrounded by the patterned portion is formed on the surface of the tire side portion.

In the tire of Supplement 28, the smooth portion formed on the surface of the tire side portion is surrounded by the patterned portion, thereby generating a large contrast between the smooth portion and the patterned portion. This enhances the visibility of the patterned portion and also enhances the visibility of the smooth portion surrounded by the patterned portion.

Supplement 29

A tire including a decorative patterned portion that is formed on a tire surface, and that is configured including plural first projections extending in a first direction in plan view and arranged spaced apart from each other in a second direction orthogonal to the first direction, and plural second projections arranged between neighboring first projections and arranged spaced apart from each other in the first direction, wherein:

in plan view each of the second projections includes a bend portion and plural extension portions, each of the extension portions extending from the bend portion in a direction intersecting the first direction, and when viewing each of the extension portions in cross-section taken in a direction orthogonal to its extension direction, wall faces of the extension portion are inclined with respect to a projection direction such that an inter-wall face spacing between the wall faces on either side gradually increases on progression from an apex to a base.

In the tire of Supplement 29, the decorative patterned portion configured including the first projections and the second projections is formed on the tire surface. In the patterned portion, incident light is attenuated while being reflected back and forth between the respective projections, thereby suppressing light reflection. Accordingly, for example, in cases in which a smooth portion is formed adjacent to the patterned portion, a large contrast is generated between the patterned portion and the smooth portion, thereby enhancing the visibility of the patterned portion.

In the above tire, since the first projections extend along the first direction in plan view, the flow of rubber in between blades used to mold the first projections when molding the tire in a mold is facilitated (in other words, it is easier for air to escape from between the blades used to form the first projections) in comparison to, for example, configurations in which the first projections do not extend along a single direction and are instead staggered. Molding characteristics of the first projections (patterned portion) are thus secured.

Moreover, in the above tire, in plan view plural of the second projections are arranged between neighboring first projections and arranged spaced apart from each other in the first direction. Accordingly, in comparison to configurations in which, for example, the second projections are not arranged between neighboring first projections, the incident light is attenuated while being reflected back and forth between the second projections even when light is incident to the patterned portion from a specific direction (for example, a direction orthogonal to the second direction), thereby suppressing light reflection. Namely, light reflection can be suppressed even when light is incident to the patterned portion from different directions. Accordingly, for example, in cases in which a smooth portion is formed adjacent to the patterned portion, a reduction in contrast between the patterned portion and the smooth portion depending on the angle from which the patterned portion is viewed is suppressed.

Moreover, in the above tire, in plan view the second projections each include plural extension portions extending from the bend portion, thereby increasing the projection components extending in different directions. Light incident to the patterned portion is thus more effectively attenuated, and light reflection is further suppressed.

Moreover, in the above tire, in plan view the extension portions of the plural second projections each extends in a direction intersecting the first direction, thereby increasing the projection components extending in different directions in comparison to cases in which, for example, the extension portions of the plural second projections extend along the first direction in plan view. Light incident to the patterned portion is thus more effectively attenuated between the respective projections, and light reflection is further suppressed.

Moreover, in the above tire, when viewing each of the extension portions of the second projections in cross-section taken in a direction orthogonal to its extension direction, the wall faces of the extension portion are inclined with respect to the projection direction such that the inter-wall face spacing between the wall faces on either side gradually increases on progression from the apex to the base. Accordingly, the rigidity of the extension portions is enhanced, and the second projections are less liable to tilt over, in comparison to cases in which the inter-wall face spacing between the wall faces on either side is constant from the apex to the base. The advantageous effect of suppressing reflection of light incident to the patterned portion is thereby maintained for a long time.

Supplement 30

The tire of Supplement 29, wherein, when viewing each of the extension portions in cross-section taken along a direction orthogonal to its extension direction, the wall faces on either side jut out further in directions orthogonal to the projection direction at the base than at the apex.

In the tire of Supplement 30, when viewing each of the extension portions in cross-section taken along a direction orthogonal to its extension direction, the wall faces on either side jut out further in directions orthogonal to the projection direction at the base than at the apex. Accordingly, the rigidity of the extension portions is enhanced, and the second projections are less liable to tilt over, in comparison to cases in which, for example, only the wall face on one side juts out further in a direction orthogonal to the projection direction at the base than at the apex. The advantageous effect of suppressing reflection of light incident to the patterned portion is thereby maintained for a long time. Moreover, during demolding, the extension portions are easy to remove from between blades in the mold.

Supplement 31

The tire of Supplement 30, wherein, when viewing each of the extension portions in cross-section taken along a direction orthogonal to its extension direction, a height of the extension portion along a projection direction is within a range of from 0.8 to 6 times the inter-wall face spacing at the base.

In the tire of Supplement 31, when viewing each of the extension portions of the second projections in cross-section taken along a direction orthogonal to its extension direction, the height of the extension portion along the projection direction of the extension portion is within a range of from 0.8 to 6 times the inter-wall face spacing between the wall faces on either side at the base. This thereby enables tilting over of the extension portions, as well as reflection of light incident to the patterned portion, to be more effectively suppressed than in cases in which, for example, the above length is not within a range of from 0.8 to 6 times the above spacing.

Supplement 32

The tire of either Supplement 30 or Supplement 31, wherein, when viewing each of the extension portions in cross-section taken along a direction orthogonal to its extension direction, an angle formed by each of the wall faces with respect to the projection direction is within a range of from 5° to 30°.

In the tire of Supplement 32, when viewing each of the extension portions of the second projections in cross-section taken along a direction orthogonal to its extension direction, an angle formed by each of the wall faces with respect to the projection direction of the extension portion is within a range of from 5° to 30°. This thereby enables tilting over of the extension portions, as well as reflection of light incident to the patterned portion, to be more effectively suppressed than in cases in which, for example, above the angles are not within a range of from 5° to 30°.

Supplement 33

The tire of any one out of Supplements 29 to 32, wherein, when viewing each of the extension portions in cross-section taken along a direction orthogonal to its extension direction, an apex of each extension portion is curved in a circular arc shape.

In the tire of Supplement 33, when viewing each of the extension portions of the second projections in cross-section taken along a direction orthogonal to its extension direction, the extension portion is curved in a circular arc shape. The volume of the extension portions is accordingly increased in comparison to cases in which, for example, the apexes of the extension portions are configured with pointed profiles, thereby enabling tilting on the apex side to be suppressed.

Supplement 34

The tire of any one out of Supplements 29 to 33, wherein, when viewing each of the first projections in cross-section taken in a direction orthogonal to its extension direction, wall faces of the first projection are inclined with respect to a projection direction such that an inter-wall face spacing between the wall faces on either side gradually increases on progression from an apex to a base.

In the tire of Supplement 34, when viewing each of the first projections in cross-section taken in a direction orthogonal to its extension direction, the wall faces of the first projection are inclined with respect to the projection direction such that the inter-wall face spacing between the wall faces on either side gradually increases on progression from the apex to the base. Accordingly the first projections are less liable to tilt over than in cases in which, in which, for example, the inter-wall face spacing between the wall faces on either side is constant from the apex to the base. Accordingly, the advantageous effect of suppressing reflection of light incident to the patterned portion is maintained for a long time.

Supplement 35

The tire of any one out of Supplements 29 to 34, wherein:

a placement pitch of the first projections is within a range of from 0.5 mm to 1 mm; and projection direction heights of the first projections and the second projections are each within a range of from 0.1 mm to 1 mm.

In the tire of Supplement 35, the placement pitch of the first projections is within a range of from 0.5 mm to 1 mm, and the projection direction heights of the first projections and the second projections are each within a range of from 0.1 mm to 1 mm. Accordingly, in comparison to cases in which, for example, the placement pitch of the first projections is not within a range of from 0.5 mm to 1 mm, and the projection direction heights of the first projections and the second projections are not each within a range of from 0.1 mm to 1 mm, light incident to the patterned portion is attenuated while being reflected back and forth between the respective projections, such that light reflection is further suppressed.

Supplement 36

The tire of any one out of Supplements 29 to 35, wherein the tire surface is a surface of a tire side portion; and a smooth portion surrounded by the patterned portion is formed on the surface of the tire side portion.

In the tire of Supplement 36, the smooth portion formed on the surface of the tire side portion is surrounded by the patterned portion, thereby generating a large contrast between the smooth portion and the patterned portion. This enhances the visibility of the patterned portion and also enhances the visibility of the smooth portion surrounded by the patterned portion.

Supplement 37

A tire including a decorative patterned portion that is formed on a tire surface, and that is configured including plural first projections extending in a first direction in plan view and arranged spaced apart from each other in a second direction orthogonal to the first direction, and plural second projections arranged between neighboring first projections and arranged spaced apart from each other in the first direction, wherein:

in plan view each of the second projections includes a bend portion and plural extension portions extending from the bend portion, each of the extension portions extending in a direction intersecting the first direction.

In the tire of Supplement 37, the decorative patterned portion configured including the first projections and the second projections is formed on the tire surface. In the patterned portion, incident light is attenuated while being reflected back and forth between the respective projections, thereby suppressing light reflection. Accordingly, for example, in cases in which a smooth portion is formed adjacent to the patterned portion, a large contrast is generated between the patterned portion and the smooth portion, thereby enhancing the visibility of the patterned portion.

In the above tire, since the first projections extend along the first direction in plan view, the flow of rubber in between blades used to mold the first projections when molding the tire in a mold is facilitated (in other words, it is easier for air to escape from between the blades used to form the first projections) in comparison to, for example, configurations in which the first projections do not extend along a single direction and are instead staggered. Molding characteristics of the first projections (patterned portion) are thus secured.

Moreover, in the above tire, in plan view plural of the second projections are arranged between neighboring first projections and arranged spaced apart from each other in the first direction. Accordingly, in comparison to configurations in which, for example, the second projections are not arranged between neighboring first projections, the incident light is attenuated while being reflected back and forth between the second projections even when light is incident to the patterned portion from a specific direction (for example, a direction orthogonal to the second direction), thereby suppressing light reflection. Namely, light reflection can be suppressed even when light is incident to the patterned portion from different directions. Accordingly, for example, in cases in which a smooth portion is formed adjacent to the patterned portion, a reduction in contrast between the patterned portion and the smooth portion depending on the angle from which the patterned portion is viewed is suppressed.

Moreover, in the above tire, in plan view the second projections each include plural extension portions extending from the bend portion in directions intersecting the first direction, thereby increasing the projection components extending in different directions in comparison to, for example, configurations in which the second projections include extension portions extending along the first direction in plan view. Light incident to the patterned portion is thus more effectively attenuated between the respective projections, and light reflection is further suppressed. Accordingly, for example, in cases in which a smooth portion is formed adjacent to the patterned portion, an even larger contrast is generated between the patterned portion and the smooth portion, thereby enhancing the visibility of the patterned portion.

Supplement 38

The tire of Supplement 37, wherein, in plan view, angles in neighboring second projections formed by each of the extension portions with respect to the first direction differ from each other.

In the tire of Supplement 38, in plan view angles in neighboring second projections formed by each of the extension portions with respect to the first direction differ from each other. Accordingly, projection components extending in different directions are increased in comparison to cases in which, for example, angles in neighboring second projections formed by each of the extension portions with respect to the first direction do not differ from each other. Light incident to the patterned portion is more effectively attenuated, and light reflection is further suppressed. Accordingly, for example, in cases in which a smooth portion is formed adjacent to the patterned portion, an even greater contrast is generated between the patterned portion and the smooth portion, further enhancing the visibility of the patterned portion.

Supplement 39

The tire of Supplement 37 or Supplement 38, wherein, in plan view, each of the first projections has a shape having an amplitude in the second direction.

In the tire of Supplement 39, in plan view each of the first projections has a shape having an amplitude in the second direction. Accordingly, light incident to the patterned portion more readily undergoes scattering reflection between the respective projections than in cases in which, for example, the first projections have shapes extending in straight line shapes along the first direction in plan view. Light reflection is thereby further suppressed. Accordingly, for example, in cases in which a smooth portion is formed adjacent to the patterned portion, even greater contrast is generated between the patterned portion and the smooth portion, thereby enhancing the visibility of the patterned portion.

Supplement 40

The tire of any one out of Supplements 37 to 39, wherein:

a placement interval of the first projections is within a range of from 0.5 mm to 1 mm; and projection direction heights of the first projections and the second projections are each within a range of from 0.1 mm to 1 mm.

In the tire of Supplement 40, the placement pitch of the first projections is within a range of from 0.5 mm to 1 mm, and the projection direction heights of the first projections and the second projections are each within a range of from 0.1 mm to 1 mm. Accordingly, in comparison to cases in which, for example, the placement pitch of the first projections is not within a range of from 0.5 mm to 1 mm, and the projection direction heights of the first projections and the second projections are not each within a range of from 0.1 mm to 1 mm, light incident to the patterned portion is attenuated while being reflected back and forth between the respective projections, such that light reflection is further suppressed.

Supplement 41

The tire of any one out of Supplements 37 to 40, wherein the tire surface is a surface of a tire side portion; and a smooth portion surrounded by the patterned portion is formed on the surface of the tire side portion.

In the tire of Supplement 41, the smooth portion formed on the surface of the tire side portion is surrounded by the patterned portion, thereby generating contrast between the smooth portion and the patterned portion. This enhances the visibility of the patterned portion and also enhances the visibility of the smooth portion surrounded by the patterned portion.

The invention claimed is:

1. A tire comprising a decorative patterned portion that is formed on a tire surface, and that is configured including a plurality of first projections extending in a first direction in plan view and arranged spaced apart from each other in a second direction orthogonal to the first direction, and a plurality of second projections arranged between neighboring first projections and arranged spaced apart from each other in the first direction, wherein:

in plan view, each of the second projections includes a bend portion and a plurality of extension portions extending from the bend portion;

a placement pitch of the first projections is within a range of from 0.6 mm to 0.8 mm; and projection direction heights of the first projections and the second projections are each within a range of from 0.2 mm to 0.8 mm.

2. The tire of claim 1, wherein, in plan view, each of the first projections has a shape having an amplitude in the second direction.

3. The tire of claim 2, wherein, in plan view, each of the first projections has a sine wave shape.

4. The tire of claim 2, wherein a spacing between neighboring first projections is constant.

5. The tire of claim 1, wherein, in plan view, each of the extension portions extends in a direction intersecting the first direction.

6. The tire of claim 5, wherein, in plan view, angles in neighboring second projections formed by each of the extension portions with respect to the first direction differ from each other.

7. The tire of claim 5, wherein, in plan view, in neighboring second projections in the first direction, angles formed by each of the extension portions with respect to the first direction differ from each other, or projection shapes of the second projections differ from each other.

8. The tire of claim 5, wherein, when viewing each of the extension portions in a cross-section taken in a direction orthogonal to its extension direction, wall faces of the extension portion are inclined with respect to a projection direction such that an inter-wall face spacing between the wall faces on either side gradually increases on progression from an apex to a base.

9. The tire of claim 8, wherein, when viewing each of the extension portions in the cross-section taken in a direction orthogonal to its extension direction, the wall faces on either side jut out further in a direction orthogonal to the projection direction at the base than at the apex.

10. The tire of claim 8, wherein, when viewing each of the extension portions in the cross-section taken in a direction orthogonal to its extension direction, the apex is curved in a circular arc shape.

11. The tire of claim 1, wherein, when viewing each of the first projections in a cross-section taken in a direction orthogonal to its extension direction, wall faces of the first projection are inclined with respect to a projection direction such that an inter-wall face spacing between the wall faces on either side gradually increases on progression from an apex to a base.

12. The tire of claim 1, wherein a portion of each of the second projections is connected to one of the first projections.

13. The tire of claim 12, wherein the bend portion of each of the second projections is connected to one of the first projections.

14. The tire of claim 13, wherein, in neighboring second projections, the respective bend portions are connected to different first projections from each other.

15. The tire of claim 1, wherein the second projections are discrete from the first projections.

16. The tire of claim 1, wherein, in plan view, each of the first projections has a shape having an amplitude in the second direction, and in plan view, each of the extension portions extends in a direction intersecting the first direction.

17. The tire of claim 1, wherein, in plan view, each of the first projections has a shape having an amplitude in the second direction, and when viewing each of the first projections in a cross-section taken in a direction orthogonal to its extension direction, wall faces of the first projection are inclined with respect to a projection direction such that an inter-wall face spacing between the wall faces on either side gradually increases on progression from an apex to a base.

18. The tire of claim 1, wherein, in plan view, each of the first projections has a shape having an amplitude in the second direction, and a portion of each of the second projections is connected to one of the first projections.

19. The tire of claim 1, wherein, in plan view, each of the first projections has a shape having an amplitude in the second direction, the second projections are discrete from the first projections.

20. The tire of claim 1, wherein, in plan view, each of the first projections has a shape having an amplitude in the second direction, and in plan view, each of the first projections has a sine wave shape, and a spacing between neighboring first projections is constant.

* * * * *